(12) United States Patent
Horsfall

(10) Patent No.: US 8,768,807 B2
(45) Date of Patent: *Jul. 1, 2014

(54) ELECTRONIC TRADING SYSTEM

(75) Inventor: Peter Richard Horsfall, Morristown, NJ (US)

(73) Assignee: EBS Group Limited, London (GB)

( * ) Notice: Subject to any disclaimer, the term of this patent is extended or adjusted under 35 U.S.C. 154(b) by 70 days.

This patent is subject to a terminal disclaimer.

(21) Appl. No.: 13/466,818

(22) Filed: May 8, 2012

(65) Prior Publication Data

US 2012/0226596 A1 Sep. 6, 2012

Related U.S. Application Data

(60) Continuation of application No. 12/565,067, filed on Sep. 23, 2009, now Pat. No. 8,195,544, which is a division of application No. 09/942,426, filed on Aug. 29, 2001, now Pat. No. 7,613,640.

(51) Int. Cl.
*G06Q 40/00* (2012.01)

(52) U.S. Cl.
USPC .......................................... 705/35; 705/36 R

(58) Field of Classification Search
None
See application file for complete search history.

(56) References Cited

U.S. PATENT DOCUMENTS

| | | | |
|---|---|---|---|
| 5,136,501 A | | 8/1992 | Silverman et al. |
| 5,375,055 A | * | 12/1994 | Togher et al. .................. 705/37 |
| 5,689,652 A | | 11/1997 | Lupien et al. |
| 5,924,083 A | | 7/1999 | Silverman et al. |
| 6,366,890 B1 | * | 4/2002 | Usrey ........................... 705/7.31 |
| 7,024,386 B1 | | 4/2006 | Mills et al. |
| 2002/0099647 A1 | | 7/2002 | Howorka et al. |
| 2003/0088499 A1 | * | 5/2003 | Gilbert et al. ................... 705/37 |

FOREIGN PATENT DOCUMENTS

| | | |
|---|---|---|
| EP | 0512702 | 11/1992 |
| EP | 1-100030 | 10/2000 |
| EP | 1 100 030 A1 | 5/2001 |
| JP | 6-96359 | 4/1994 |
| JP | 10-504409 | 4/1998 |
| WO | WO-96 05563 | 2/1996 |
| WO | WO-99/19821 | 4/1999 |
| WO | WO-00/11587 A1 | 3/2000 |
| WO | WO-00/16224 A1 | 3/2000 |
| WO | WO-01/11521 A1 | 2/2001 |
| WO | WO-01/48668 A1 | 7/2001 |
| WO | WO-01 59661 | 8/2001 |
| WO | WO-02/059815 A1 | 8/2002 |
| WO | WO-02/099563 A2 | 12/2002 |

OTHER PUBLICATIONS

Project EPM Notes of the business/technical off-site meeting held Aug. 13, 1999 at Waldorf Astoria Hotel, Aldwych, London.

(Continued)

*Primary Examiner* — Olabode Akintola
(74) *Attorney, Agent, or Firm* — Dickstein Shapiro LLP

(57) ABSTRACT

An anonymous trading system comprises one or more matching engines, one or more market distributors and one or more trader terminals for input of orders from institutions trading on the system. The trader terminals are connected to the system through bank nodes. A broker terminal is connected through a bank node and enables voice brokers to trade on the system on behalf of client traders. The voice brokers terminal can be configured for any client trader and will display the market view for that trader. Trades in which the broker terminal participates are not concluded until a manual credit check has been performed.

1 Claim, 20 Drawing Sheets

(56) References Cited

OTHER PUBLICATIONS

Peter Horsfall, "EPM PRocess Overview," Aug. 20, 1999, Version 0, EBS Dealing Resources, Inc.

Hidekazu Miyoshi; "All about e-Stock Market"; First edition, Tokyo Shoseki Co., Ltd., Apr. 25, 2000, pp. 36-49.

Japanese Patent Office Action for corresponding Japanese Application No. 2003-523430, mailed Jan. 6, 2009 (and English translation thereof).

http://about.reuters.com/newsreleases/art, "Instinet Unveils Technology Architecture of Fix Income Trading Brokerage", New Release, Jun. 15, 1999.

UK Search Report dated Feb. 27, 2003.

* cited by examiner

ELECTRONIC TRADING SYSTEM

CROSS REFERENCE TO RELATED APPLICATION

This is Continuation of U.S. application Ser. No. 12/565,067, filed Sep. 23, 2009, which claims priority to U.S. application Ser. No. 09/942,426 now U.S. Pat. No. 7,613,640. The contents of all these applications are incorporated by reference.

FIELD OF THE INVENTION

This invention relates to an electronic trading system, and in particular, but not exclusively, to systems for trading financial instruments, including, but not limited to, forward rate agreements (FRAs), Spot F/X and swaps. It is also concerned with commodity trading systems.

BACKGROUND TO THE INVENTION AND DESCRIPTION OF PRIOR ART

Traditionally, financial instruments such as foreign exchange and forward rate agreements were traded through voice brokers. Traders would call their voice broker with a bid or offer and the broker would attempt to find a match with a counterparty. The voice broker would not necessarily reveal the identity of the counterparty at the earliest stage of the deal but would ensure that each of the parties extended to the other sufficient lines of credit for a deal to be completed. Where a trader trades through a given broker frequently, the broker will get to know with what counterparties the trader has a line of credit and, empirically, will filter out bids or offers of which he is aware if he considers that there is little or no likelihood of the trader being able to trade with the counterparty in question.

With the advent of computerised trading systems, the importance of voice brokers has diminished and much of the trades executed, for example on the F/X spot market, are conducted through anonymous trading systems or electronic conversational systems which attempt to mimic the role of the voice broker. However, voice brokers have not been entirely replaced by electronic systems and they still play an important role in the market.

A number of anonymous trading systems have been proposed and introduced into the market. At present, two systems, provided by Reuters Limited of London England and EBS Dealing. Resources, Inc, of New York, N.Y. are prevalent in the foreign exchange spot (F/X spot) trading market. Both of these systems are anonymous in that traders enter bids and offers anonymously and see prices entered into the system by potential counterparties but not the identity of those counterparties. The identities of the parties are only revealed when the deal has been completed. To ensure that deals are not effected between parties which do not have a sufficient line of credit with each other for the deal, a complex credit checking operation is performed before deal completion. If there is insufficient credit the deal is either rejected or only partially completed.

A version of the EBS System is described in U.S. Pat. No. 5,375,055, the disclosure of which is incorporated herein by reference. In this system, credit limits set by the potential parties to transactions are stored at Market Access Nodes to which workstations are connected. An institution will set and store a credit limit for each potential counterparty with which it is prepared to deal. The Market Access Nodes are linked to one or more Market Distributors and one or more Arbitrators.

The Market Distributors distribute prices of bids and offers using a pre-authorised matrix derived from the credit limits stored at the Market Access Nodes. The pre-authorisation matrix is used to inhibit trades between incompatible counterparties and to screen bids and offers prior to display so that each trader workstation displays only those bids and offers submitted by counterparties with whom he has credit. Thus, all displayed prices are dealable.

The arbitrators' function is to match bids and offers and to resolve possible contentions in trades which could arise due to the nature of the system.

The Reuters system is exemplified in EP-A-0,399,850, EP-A-0,406,026 and EP-A-0,411,748.

Both the systems identified above have been accepted by the financial markets and have been very successful. However, they suffer from the disadvantage that they are separated from the rest of the institutions' trading operations. Thus, only those institutions which have installed one of the systems can trade using it. Trades are limited to the amount of credit which has been assigned. This credit can not be used for other trades, for example outside the system fur different instruments, even if made with the same counterparty. This restriction can reduce liquidity. The existing systems also have the disadvantage that traders are limited to trading the specific instruments provided for by the systems.

SUMMARY OF THE INVENTION

The present invention aims to address the disadvantages of existing systems mentioned above and to provide a more flexible electronic trading system.

In its broadest form, the invention resides in the incorporation of voice broking functions into an electronic or anonymous trading system.

More specifically, there is provided a computerised trading system for trading instruments between trading parties, comprising: a communications network for transmitting electronic messages; a plurality of trader order input devices connected to the communications network, each for generating electronic orders including bid and/or offer orders and for communication to traders of order information received from other input devices over the network; at least one broker order input device connected to the communications networks for generating electronic orders including bid and/or offer orders on behalf of a selected one of a plurality of client traders and for communication to a broker of order information received from other input devices over the network; at least one matching engine connected to the network for matching bid and offer orders input into the system from the order input devices and for executing deals where prices are matched; and a market distributor connected to the network for distributing order price messages to the order input devices, the market distributor being responsible to the order messages and the matching engine.

The invention also provides a computerised trading system for trading instruments between parties comprising: a plurality or order input devices for entering order information into the system, the order input devices including a plurality of trader input devices for inputting order from traders, and at least one broker order input device for trading on behalf of a plurality of clients; at least one matching engine connected to the network for matching bid and offer orders input into the system and for executing deals where orders are matched; and a market distributor for distributing order price messages to the order input devices, the market distributor being responsible to the order messages and the matching engine, wherein trades conducted between trader order input devices are anonymous as to the parties until completion of a trade, and trades to which the broker order input device is a party require disclosure of the parties to the trade prior to completion of the trade.

The invention further comprises a computerised trading system for trading instruments between parties including a plurality of order input devices for inputting bid and offer orders on behalf of traders, a matching engine for matching bids and offers input by traders and, where matches are made, for executing deals, and a market distributor for distributing details of at least a portion of the bids and offers in the market to traders, wherein at least one of the order input devices comprises a broker terminal for entering bids and offers into the system on behalf of traders operating outside the system.

Embodiments of the invention have the advantage that they enable voice traders to be linked into an automated trading system so enabling trades involving voice traders to contribute to the liquidity of the trading system.

Preferably, the automated trading system is an anonymous system but trades involving a voice trader or voice broker are not anonymous.

BRIEF DESCRIPTION OF DRAWINGS

Embodiments of the invention will now be described, by way of example only, and with reference to the accompanying drawings in which:

FIG. 1 is a screen shot of a known FRA trading screen;

FIG. 8 is a screen shot showing the market from the Trader's client's point of view after the offer from him has been submitted;

FIG. 10 is a screen shot of the voice broker's workstation after the electronic trader has hit the offer;

FIG. 11 is a screen shot of the broker's work station after the broker's client has accepted the electronic trader's hit;

FIG. 12 is a screen shot of the Broker's workstation when the electronic trader's hit has timed out;

FIG. 13 is a screen shot of the Broker's workstation once the deal has been completed;

FIG. 16 is a flow chart showing how the electronic trader is required to disclose his identity in the process of FIG. 15;

FIG. 17 is a screen shot showing the electronic trader's workstation after the trader accepts a hit from the broker and allowing the accepted amount to be adjusted;

FIG. 20 is a screen shot of the Broker's workstation showing how the amounts available are shown apportioned between voice broker's and electronic traders.

DESCRIPTION OF BEST MODE

Figure 2:
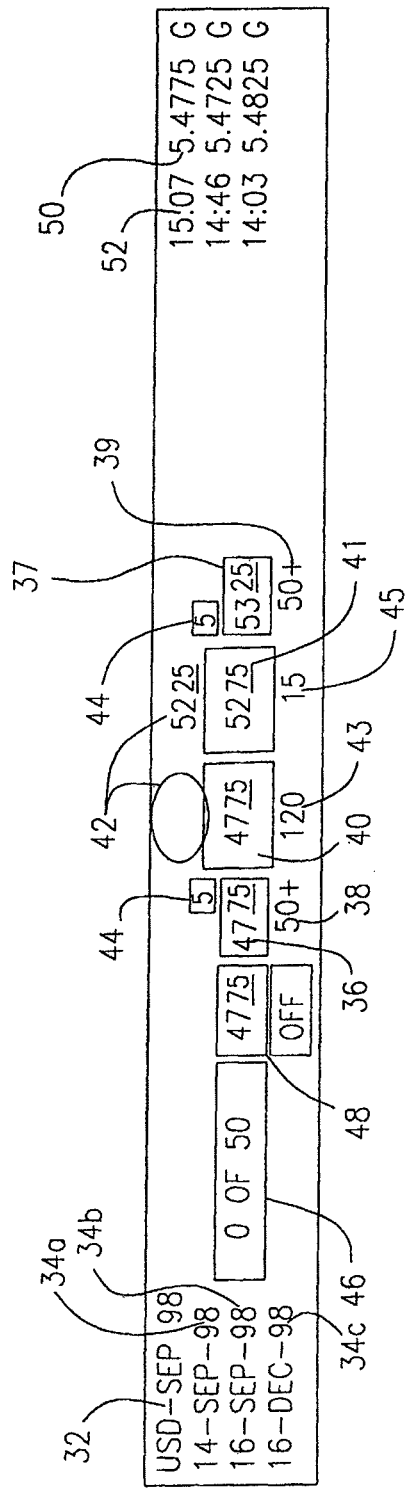
FIG. 2 shows a Tenor Detail Panel of the screen illustrated in FIG. 1.

The following description is given with respect to an exemplary FRA (Forward Rate Agreement) trading system. It is to be understood that this has been chosen only to exemplify the invention and that the invention is not limited to any particular financial instrument or even to financial instrument trading systems. For example, the invention may be embodied in other financial trading systems for trading instruments such as F/X spot, F/X forwards and swaps or in commodities trading systems. This list is not to be construed as limiting.

WO00/16224 of EBS Dealing Resources, Inc. describes a Forward Rate Agreement trading system. The contents of that document are incorporated herein by reference.

A Forward Rate Agreement (FRA) is a contract between two parties to lock in a forward interest rate, for a period, starting at a specific date in the future. Each FRA contract can be categorised as a spot FRA, an IMM FRA or a broken date FRA. The system to be described is only intended to trade spot FRAs and IMM FRAs although trading of broken date FRAs is within the scope of the invention. IMM is the abbreviation which has become customary to refer to an instrument traded on one of the International Monetary Market dates. In brief, IMM FRAs are traded for the four International Monetary Market (IMM) dates. Spot FRAs are traded for dates associated with today's spot date.

Figure 1:
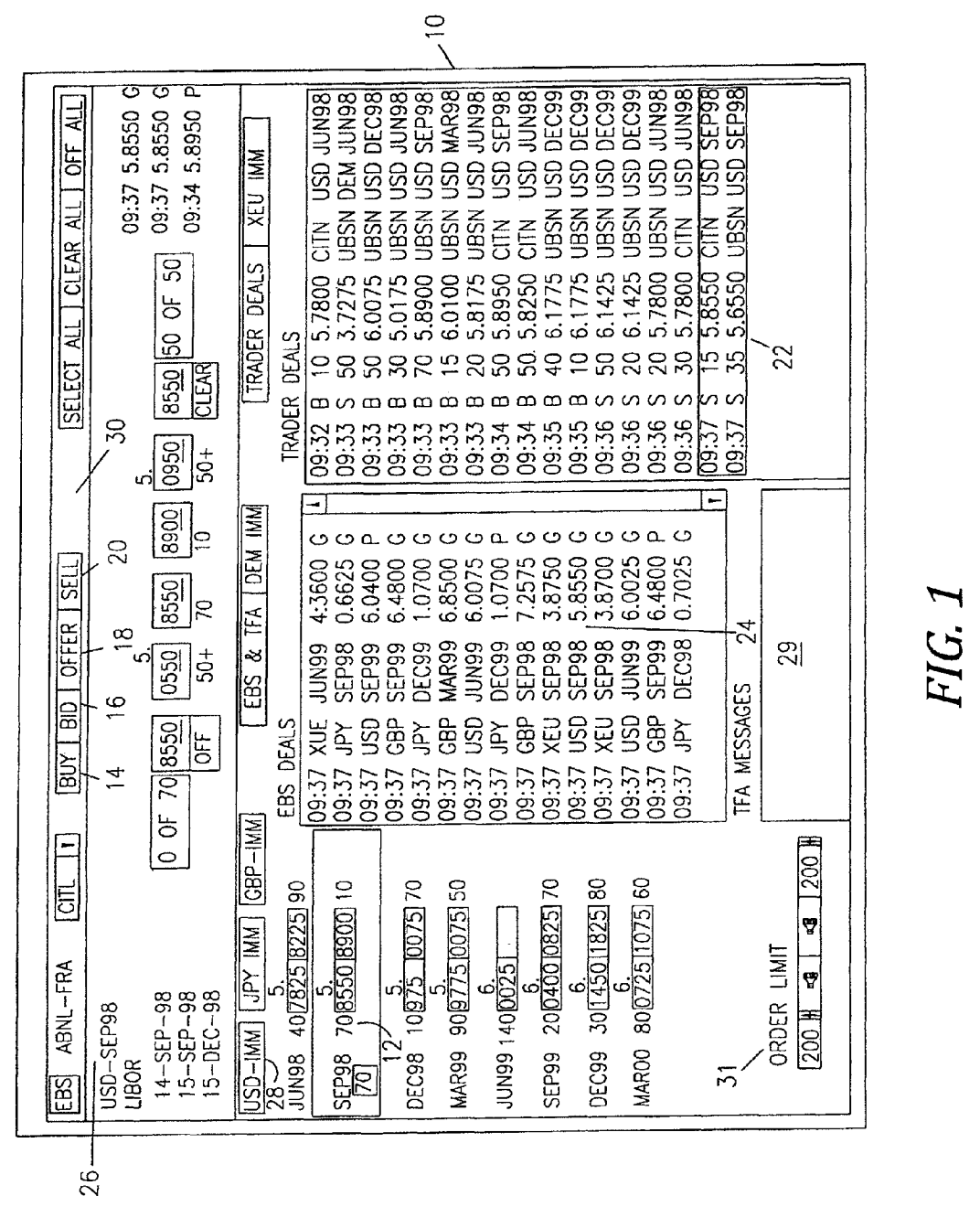

A FRA trading screen 10, is shown in FIG. 1. The FRA trading workstation presents a set of FRA contracts that may be traded in an electronically brokered format. Each type of contract is known as a tenor. Price information for a particular tenor is displayed on a tenor line 12. For each tenor line, the dealing system presents the best credit-screened bid and offer prices of all active quotes. Upon selection of the tenor line, the workstation presents a detailed view of the associated tenor showing contract dates and additional market view information.

A trader may select a tenor line and then submit one of four order types (Bid, Offer, Buy or Sell). Each type of order requires the trader to specify an interest rate notional amount for a particular tenor. Once submitted, new orders are matched with outstanding orders in price/time priority. Compatible orders are matched resulting in the execution of deals. In order to encourage market making a trader can submit and adjust bids and offers for several tenors at a time.

For non-standard FRAs, a price inquiry function allows the trader to issue a system-wide broadcast to request a price for a broken date FRA. A trader may respond to a price inquiry by selecting the entry in the bulletin board.

The credit facility uses pre-screened prices. Trading Floor Administrators (TFAs) at the trading floors enter credit limits for each counterparty group of trading floors. Dealable prices are distributed to those floors that have credit with the price maker.

The trading screen shown in FIG. 1 provides traders with the facility to enter bids, offers, buy or sell orders by selecting buttons, 14, 16, 18, 20 on a toolbar at the top of the screen. The best bid/offer prices are displayed for tenors of various lines in one window 12 and deals done by the trader and on the system as a whole are displayed in other windows 22, 24. The display is better understood with reference to an example of a FRA deal.

As mentioned above, a Forward Rate Agreement (FRA) is a contract between two parties to lock in a forward interest rate, for a period, staring at a specific date in the future.

For example, a 6×9 FRA is a contract covering a period that beings 6 months from now and ends 9 months from now. The "term" or "gap" of such a contract is 3 months. The two counterparties, one buyer and one seller, settle by cash payment at the start of the contract (in this case 6 months from now).

The buyer of a FRA will be compensated if future interest rates rise. The seller of a FRA will be compensated if future interest rates fall.

Settlement is based on the difference between the actual interest rate prevailing on the fixing date and the rate specified in the contract, for a specific notional amount stated in the contract. Settlement takes place at the beginning of the term.

As an example, consider a USD 6×9 FRA trade for $100 million (US) at an agreed upon rate of 5.5675 executed on Sep. 9, 1997. The deal has the following characteristics:

Trade Date: Sep. 9, 1997
Spot Date: Sep. 11, 1997
Fixing Date: Mar. 9, 1998
Settlement Date: Mar. 11, 1998
Maturity Date: Jun. 11, 1998
Contract Rate: 5.5675
Notional Amount: 100 million (US$)
Reference Rate: LIBOR The period of this deal begins on Mar. 11, 1998 (the settlement date) and ends on Jun. 11, 1998 (the maturity date). On March 9, sometime after 11:30 AM London time, the back office personnel at each bank will look on the appropriate Reuters page to read the 3-month LIBOR (London InterBank Offer Rate) posted for March 9. If, for example, this rate is 5.5800, then between the trade date and the fixing date, the interest rate has risen 0.0125 percent or 1¼ basis points. Therefore, a settlement amount must be calculated based on this reference rate of 5.58%. The settlement amount is the amount on the check paid by the seller to the buyer. The settlement amount is calculated using the following formula:

Settlement Amount Calculation Example $$\frac{\text{Fixing Rate} - (\text{Contract Rate}) \times (\text{Days in Period}) \times (\text{Notional Amount})}{(360 \times 100) + (\text{Fixing Rate}) \times 100 \times (\text{Days in Period})}$$

$$\frac{(5.58 - 5.5675) \times (92) \times (100,000,000)}{(360 \times 100) + (5.58 \times 100 \times (92))}$$

$$\frac{115,000000}{87,336}$$

$1,316.76

Note that if interest rates had fallen, then the buyer of the FRA must pay the seller.

FRAs serve as both a hedging and a speculative instrument. A bank may use a FRA to hedge against future inflows and outflows of cash on its balance sheet, or a bank may use a FRA to speculate in the future movement of interest rates. By definition, a FRA trade is over-the-counter. The resultant contract is between two parties and is therefore dissimilar to a futures contract which is traded via an exchange.

FRAs for EBS can be split into the following categories:
IMM FRAs
SPOT FRAs
Broken Date FRAs The present embodiment is described in relation to IMM FRAs; that is FRAs which are based on the International Monetary Market dates.

FRAs are distinguished by the dates of the contract, the reference rate, and the contract currency. Each type of FRA contract is called a tenor. Some examples tenors are listed below:

Examples of FRA Tenors:

| Cash 3 month | Cash 6 month | Cash 12 month |
|---|---|---|
| USD 1 × 4 | DEM 1× 7 | USD 1 × 13 |
| USD 3 × 6 | USD 2 × 8 | DEM 2 × 14 |
| JPY 6 × 9 | JPY 6 × 12 | USD 12 × 24 |

| IMM FRAs | IMM FRAs with a 6 month gap | Broken Data FRAs |
|---|---|---|
| USD September 1997 | USD June 1997-6 | USD 3 × 6 (12) |
| USD December 1997 | USD September 1998-6 | DEM 2 × 14 (10) |
| JPY March 1998 | JPY September 1998-6 | USD 0 × 3 (3) |

If the tenor is selected with a mouse or keypad, then the details of the FRA tenor line are presented in the top section of the screen. The detail area shows the best dealable, EBS best, and best regular prices for the selected tenor. The fixing date, settlement date, and maturity date of the active tenor are shown as well.

Turning again to FIG. 1, the screen can now be better understood. The Tenor Detail Panel 26 provides a detailed view of tenor line information and transaction activity. The Tab Controls 28 allow a user to select one of several user-defined tab sheets. The user may designate the tab sheet properties and components. The Tenor Line shows a tenor indicator, best bid and offer prices, best amount available for bid and offer and a big figure. The TFA Messages area 29 shows messages relating to Trading Floor Administration, such as credit notifications, deal recovery, help desk message broadcasts. The EBS Deals Listbox 24 shows deals completed on the EBS system. The Trade Deals Listbox 22 shows deals completed by the trader using the screen, and the Toolbar 30 allows the trader to select common trading commands. The screen also includes a multi tenor order limit panel 31 in which single bid and offer amounts may be specified to limit exposure across multiple tenors.

A number of tenor lines (more than fifty) may be visible on the screen concurrently. There may be additional tenor lines that are not visible on the screen due to space constraints, but can by easily be brought into view. The screen also allows the trader to elect to show fewer tenors (as few as eight) depending upon the trader's preference.

The Tenor Detail Panel is shown in FIG. 2 and shows a selected Tenor Line in more detail. It includes:
Tenor Identification 32 (currency and description);
Tenor Date Information (Fixing Date 34*a*, Settlement Date 34*b* and Maturity Date 34*c*);
Regular Dealable Bid and Offer Prices for "regular" amounts 36, 37 satisfying credit screening (A "regular" amount is an amount at least equal to a system default value representative of a typical trade in a particular currency, and may for example be 50M pounds). The amount is shown at 38, 39;

Best Dealable Bid and Offer Prices 40, 41 (the best price available after credit screening for any amount) along with the total quantity ("Best Bid 42 and Offer 43 Amounts") available at those prices;

EBS Best Bid and Offer Prices 42 (the best price available on the whole system regardless of credit (though this may not be available to the trader)) if this differs from the corresponding Best Dealable Prices; the Best Bid amount 43 and Best Offer Amount 45, which show the total amounts available at the best dealable bid or offer price for all bids or offers satisfying credit restrictions; and The "Big Figure" 44 which is the most significant digit in the price.

Note that much of this information is also shown in each Tenor Line of each Tab Sheet (FIG. 1).

To the left of FIG. 2 is a bid/buy Order Status indicator 46 showing the amount requested and obtained for an open Order. The order price 48 for an open order submitted by a dealer is shown to the right of the order amount. If an Offer/Sell Order was pending, its status would be displayed on the right.

Note that the bid (buy) prices are on the left, and the offer (sell) prices are on the right, and that all displayed prices are arranged in ascending order from left to right. The EBS Best Bid Price (if shown) will always be better than the Best Dealable Bid Price. This is because the credit granting entity for this trading floor may not have extended sufficient credit to the counterparty offering the Best Bid Price (or vice versa). Similarly, the Best Dealable Bid Price will always be at least as good as the Regular Dealable Bid Price. In the particular example shown in FIG. 2, the Best Dealable Bit Amount is 120 which is larger than the "Regular" amount of 50, and consequently the same price (5.4774) is shown as the Regular Dealable Bid Price and the Best Dealable Bid Price.

To the right of the panel are shown the three last prices paid or given 50 together with the deal time 52.

Figure 3:
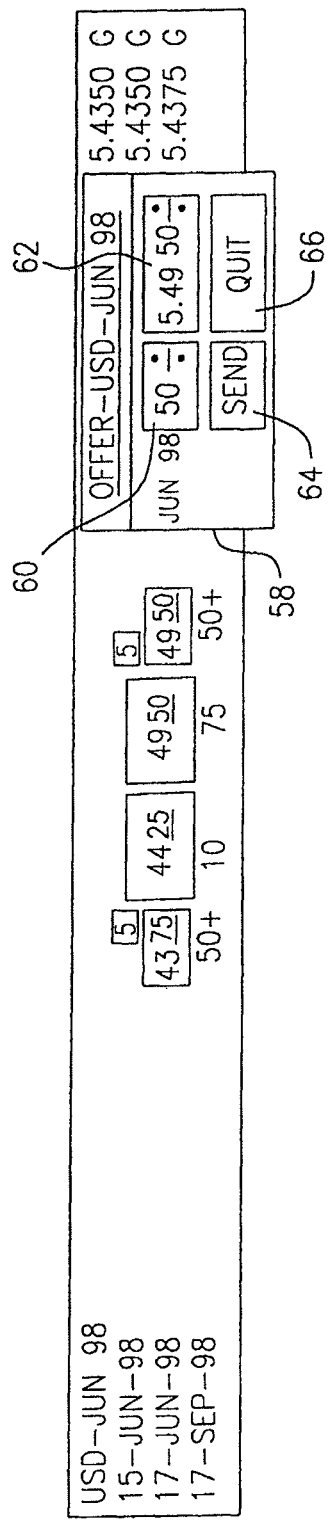
FIG. 3 shows an Order Request Panel of the screen illustrated in FIG. 1.

FIG. 3 shows the Offer Order Request Panel 58 which appears on the right side of the Tenor Detail Panel when a particular Tenor has been selected and either the Offer or Sell key has been activated. (A similar Bid Order Request Panel appears on the left side of the Tenor Detail Panel when a particular Tenor has been selected and either the Bid or Buy key has been activated). The Order Request Panel includes an Amount Entry Field 60 and a Price Entry Field 62 both of which include up and down spin buttons for adjusting the respect entries up or down, as well as a Send Pushbutton 64 for submitting the order (assuming appropriate validation checks are positive) and a Quit Pushbutton 66 which dismisses the Order Request Panel without any action being taken. As previously indicated with respect to FIGS. 1 and 2, once a valid order has been submitted, its status is displayed on both the Tenor Detail Panel (FIG. 3) and in the corresponding Tenor Line (FIG. 2), with the latter showing only the Amount Remaining in the outstanding order (ie, the difference between the Amount Requested and the Amount Obtained shown in the Tenor Detail Panel).

In the described embodiment, the trading system is an electronic brokerage system having a communication network for facilitating the buying and selling of FRAs by traders each associated with his own Workstation (WS) 77 located at a trading floor of a subscriber bank (client site). The hardware used in the system has similarities to the current EBS system for foreign exchange to which reference may be made, for example as described in U.S. Pat. No. 5,375,055.

Figure 4:
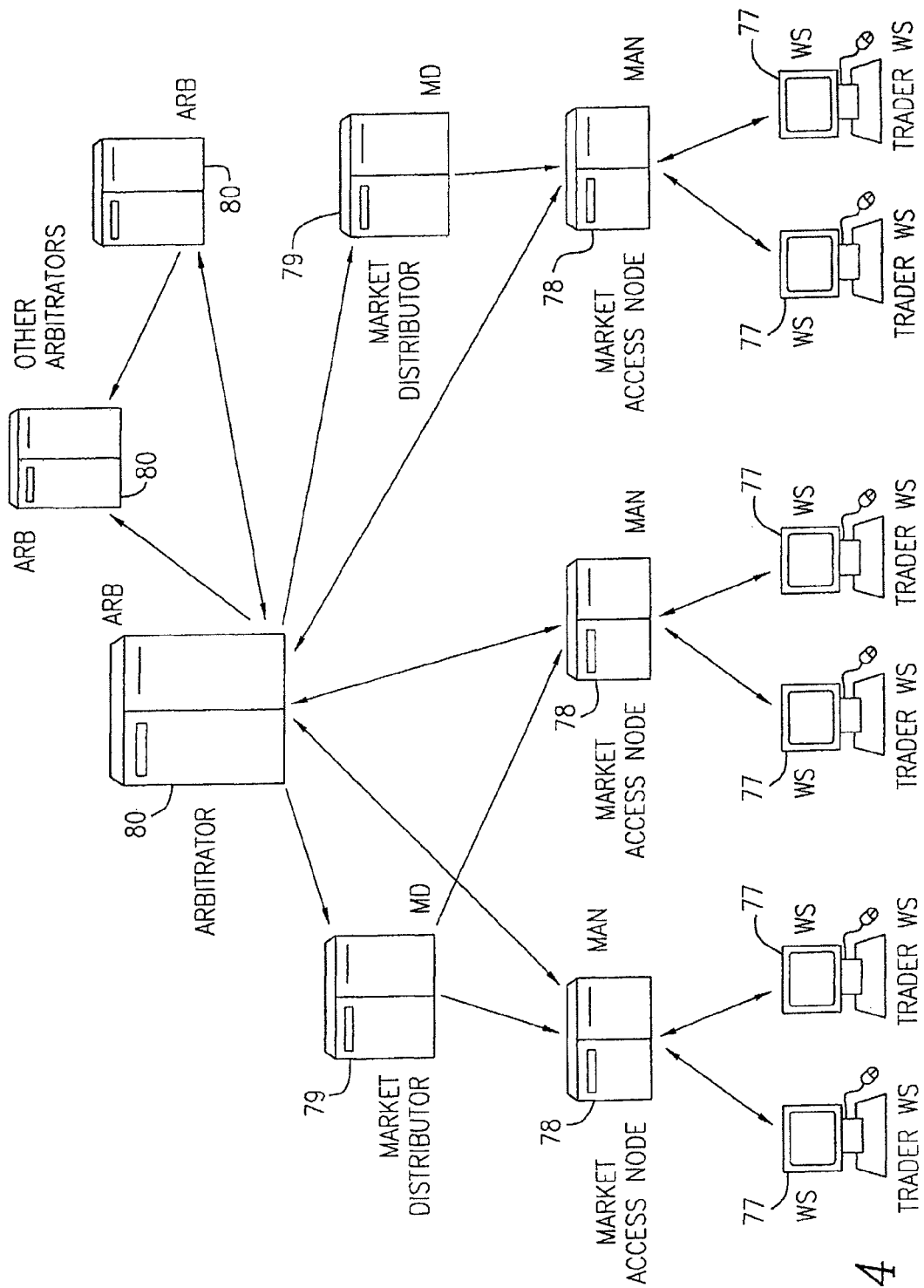
FIG. 4 is an overview of the system architecture, in particular the communications network and the various workstations and processing nodes associated with it.

As shown in FIG. 4, each client site has a dedicated client computer 78 ("Market Access Node", or "MAN") under the control of a Floor Administrator, which maintains transaction records, credit limits, and other confidential information originating with its associated trading floor. The WS's and the MAN associated with each trading floor are connected via a conventional self-repairing DEC VAX network to a nearby distribution node ("Market Distributor" or "MD") computer 79, which typically analyses and distributes current market data by means of dedicated permanent communication links to one or more associated MAN's in a particular city (or other local region), and which may also provide administrative functions for the communication network.

The communication network comprises a credit store, stored at each MAN, for storing an indication of the credit available from the group of terminals associated with that MAN to other groups. As previously explained, a group may be one or more terminals, but is preferably one or more trading floors. The function of distributing prices is fulfilled by the Market Distributors. The Market Distributors also include a credit filter comprising a yes/no Pre-Authorisation Matrix from which it is determined whether prices should be transmitted to the trader terminals for display.

Although not considered critical to the present invention, a group of MD's is preferably supplemented by common trading region processing node 80 ("Arbitrator Node" or "ARB"), with the ARB performing those functions (such as identifying potential matches between buyers and sellers, and other aspects of the "Deal Matching" process that require coordination with more that one client site) which make the most efficient use of the communication network if done centrally or regionally, while the MD's perform those functions (such as generation of separate Dealable price information for each individual client site) which are readily implemented in parallel in a distributed processing network and which make most efficient use of the communication network if done locally or in close proximity to the individual client sites.

In that regard, it is possible to have more that one ARB, with each ARB having primary responsibility for trades initiated by Market Makers in the ARB's own trading region, and being connected to all the MAN's and MD's of that trading region as well as to the other ARB's in other trading regions be permanent dedicated links of the communication network. In the majority of deals, it is anticipated that both the Maker and the Taker will be within the same trading region and this will be directly linked to the same ARB which can therefore identify a potential match and coordinate its final execution without any communication with the other ARB's; at the same time, the other ARB's can simultaneously be processing deals related to other traders in other regions. Alternatively, a single arbitrator could be dedicated to all trades involving a discrete subset of the available financial instruments. In a presently contemplated commercial embodiment, a single central Arbitrator is dedicated to FRA trades, while several regional Arbitrators are collectively dedicated to spot FX trades.

Whether the communication links between nodes are permanent (maintained indefinitely between two network components) or temporary (established dynamically for a short period of time) they are preferably "logical links" which have the property that messages sent in a certain order over the same logical link are guaranteed to reach their destination in the same order. Moreover, the communication network is preferably provided with sufficient error detection error correction, and network self-repair capability to guarantee that messages sent via these logical links are error free.

In summary, each MAN is connected to other MAN's by a robust communication network which connects the various trading floors and which supplements the MAN's with a number of processing nodes (preferably in the form of MD's and ARB's) to facilitate the distribution of price quotations and other market data and to execute transaction by matching eligible Market Makers with eligible buyers and sellers and by monitoring the transactions until they have been completed or aborted, with the MAN's being responsible for trading floor specific tasks such as logging the completed transaction and updating the credit limit that was previously available to the counterparty trading floor.

Although described above in terms of a distributed architecture, it should be noted that a single central computer system could be used to implement the various functions described above. The system of this alternative embodiment would thus comprise a plurality of workstations connected by a network to a central computer system. The central system would include the credit store, distributor and credit filter arranged to filter prices for distribution to the workstations. This is a simpler, but non-preferred, implementation. The distributed embodiment described is considered to be a more robust and secure design.

A system embodying the invention enables the system described, and further detailed in WO00/16224, to be configured to enable voice institutions to take part in the electronic broking process. This enables institutions and other customers who do not use the anonymous trading system described to participate in it through a voice broker. Thus, it broadens the scope of the market to which they have access without them having to switch from the traditional mode of broking via a voice broker.

Figure 5:
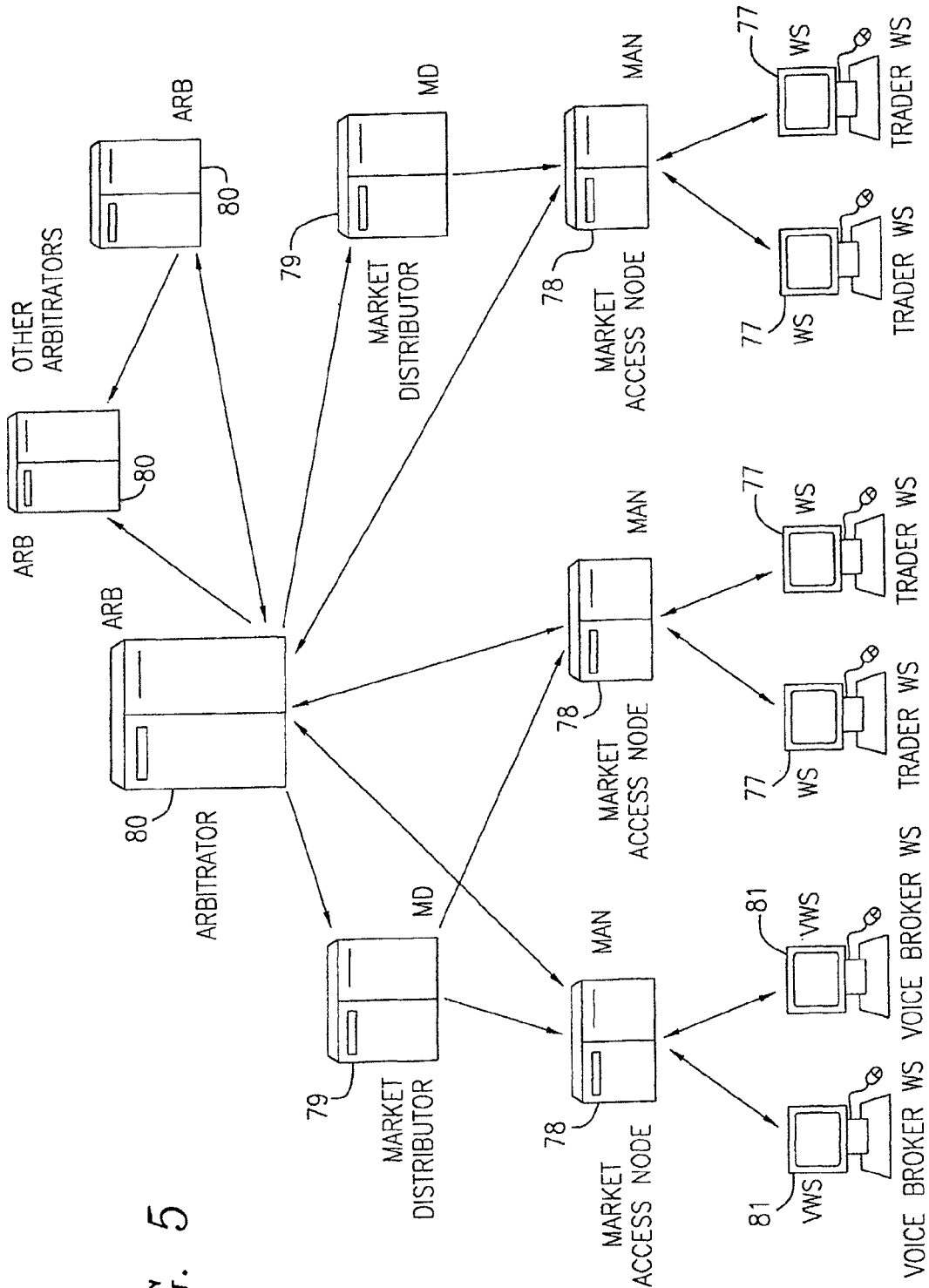
FIG. 5 is an overview of an embodiment of the present invention.

FIG. 5 shows a revised version of FIG. 4 in which a number of Voice Broker Workstations VWS 81 are included in the system. It is through these workstations VWS that the voice brokers communicate with the anonymous trading system. A number of voice broker workstations may be attached to the network.

The system supports both voice traders who also subscribe to the anonymous system as well as voice traders who act through the intermediary of a voice broker.

The voice brokers, while appearing as any other workstation to the network are treated as a special case. The VWS are supplied with the whole market book for specific tenors in price/time order rather than just the top of the market. The voice broker enters orders on behalf of voice traders but orders submitted by a voice broker are owned by that broker. In the existing system, such as described in WO00/16224, the order is owned by the trader who inputs the order into the system.

The traders, be they voice traders acting outside the anonymous trading system or electronic traders on the system, can call the voice broker on a "price for a call". This is a well understood term in the financial markets meaning that a trader is asking the broker for a price for a particular amount.

The voice broker, in response to a request for price for a call, can look at a price on the anonymous system but may also work outside the trading system by calling a number of makers to get two sided prices; that is, buy and sell prices. The voice broker can then select the best bid and best offer and quote that to the trader regardless of whether it originated on or off the anonymous trading system.

Traders on the system can call the voice brokers to place an order as a bid or offer. The voice broker submits the quote, including the price, size and name, to the market established by the anonymous trading system on the trader's behalf. The quote from the trader is included in the calculation of the credit-screened market view that is prepared for each of the traders on the system. Thus, if the quote is from a counterparty with which a given trader's institution has a line of credit, it will be visible to that trader. Traders on the system can hit the quote submitted by the voice broker in the same manner as a conventional process although the deal completion process is different as will be described. Voice broker input quotes can also be hit by voice traders acting through voice brokers.

The voice broker is in full control of the quotes that he has submitted to the anonymous trading system. He can reject or confirm deals against his quotes, for example from on-system hits. This is different from quotes input from traders on the anonymous system and is necessary as the voice broker may be working manually on a portion of the quote.

A trader can call a voice broker to buy or sell a certain amount at a certain price. The voice broker has the option of executing that order either manually or via the anonymous trading system. If it is to be executed manually, the deal is completed over the phone and is then entered as a done deal into the system. It should be noted that although completed outside the anonymous trading system, the presence of the deal in the system can still affect the system, for example, the deal particulars will be seen by other traders and may affect their bid and offer process.

If the voice broker executed the deal electronically the order is entered into the system as a bid or sell order. The broker then sees the market from that trader or trading floor's point of view. That is the market view he sees is pre-screened for credit to filter out quotes from counterparties with which the trader cannot deal. However, the credit screening is not for credit within the anonymous trading system but external credit. That is, there is a check for credit apart from the credit apportioned to the anonymous trading system, between the trader's institution and possible counterparties.

The voice broker can select quotes to be matched against orders received from the trader and may assist in deals. In that case, the deal is no longer anonymous, names are submitted and a manual credit check is made on the side which called for broker assistance. The voice broker has the power to reject the deal if credit is unavailable.

When a deal is complete it is logged into a trade database and passed to back office settlement systems.

The manner in which voice brokers interact with the anonymous trading system will now be described in the context of the FRA Trading System described with reference to FIGS. 1 to 5.

The or each voice broker is treated as an institution and as such is assigned a bank ID. The voice broker has its own market access node as described with reference to FIG. 5 and is visible to the trading floor administrator. Existing trading floors on the system then can assign credit to the voice institution as if it were any other institution with which they may wish to trade. Until that credit information has been entered, a given trading floor cannot see quotes input by the voice institution.

The voice institution then needs to enter its credit matrix on the anonymous system. Rather than assigning an individual credit amount to each institution it indicates either that it may trade or that it will not trade. All trades are subject to final confirmation by the voice institution and the credit matrix may be updated periodically, for example on a daily basis.

Figure 6:
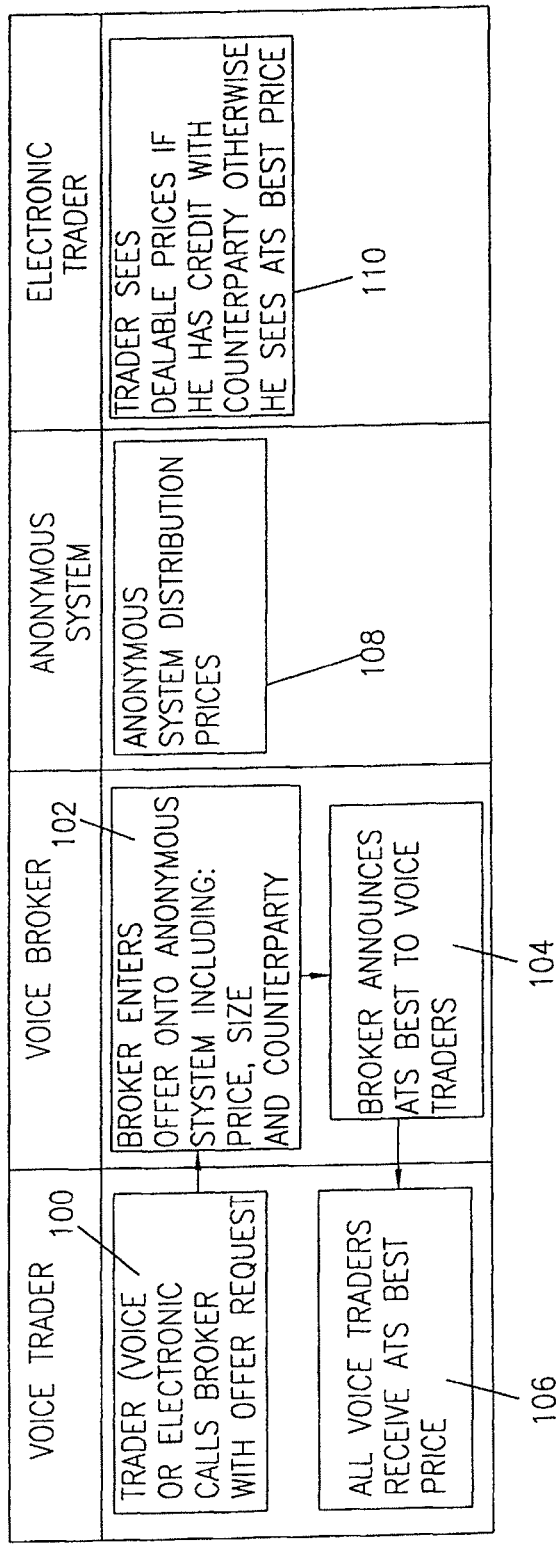
FIG. 6 is a flow chart showing a process where a voice broker submits an order to the system.

FIG. 6 illustrates the process which occurs when a voice broker submits an order to the anonymous trading system on behalf of a voice trader.

At step 100 the trader, who may be a voice or electronic trader, calls the voice broker with an offer request. The voice broker enters the offer onto the anonymous trading system including the price, the size and the counterparty, at step 102. At 104 the voice broker then announces the best price on the anonymous system which is received at 106 by all voice traders.

When the price is submitted to the anonymous trading system is it distributed to the traders at 108. A given electronic trader will see the price as a dealable price, at 110, if he has credit with counterparty otherwise he sees the best price on the anonymous trading system.

Figure 7:
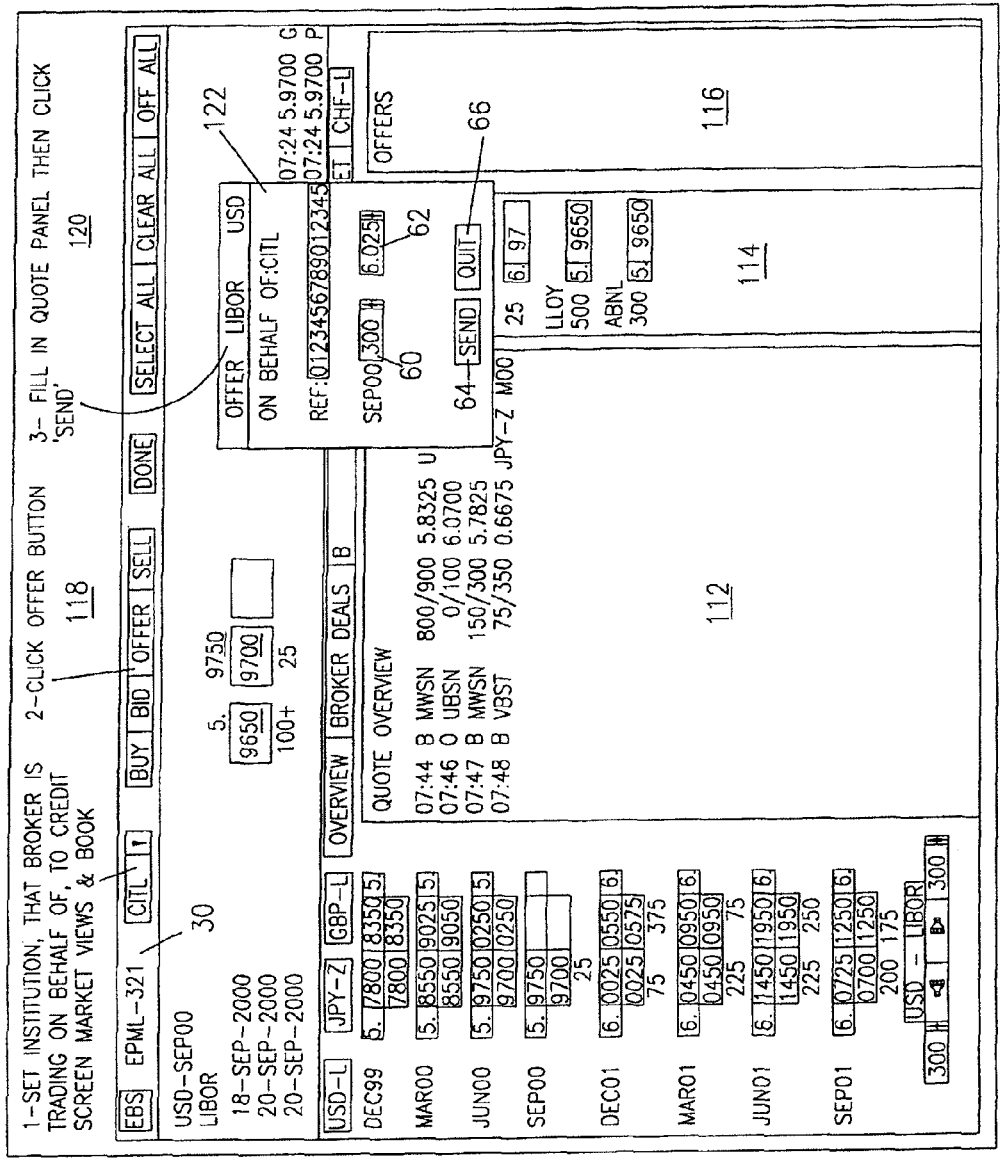
FIG. 7 is a screen shot showing an offer being entered by the voice trader on behalf of a client.

FIG. 7 shows the screen of the voice broker's workstation showing an offer being entered on behalf of a trader from an institution identified by the four letter code CITL. The screen is similar to that of FIG. 1 with the various FRA tenors shown at the left hand side of the screen and the tool bar across the top. The centre window 112 is configured to show an overview of all quotes in the system and the right hand window is split onto a column 114 showing bids and a column 116 showing offers. It will be noted that this display is a little different from that shown in FIG. 1 and appreciated that the exact display is a matter of design choice.

In the toolbar 30, the institution CITL (at 118) has been set. As a result, the broker is trading on behalf of that institution and the market view is the credit screened view appropriate to that institution and the book is the book for that institution.

The voice broker then uses his mouse to check the offer button 120 on the tool bar causing the order request or quote panel 122 to be displayed. The voice broker enters the details of the offer in the queue panel, which is very similar to that shown in FIG. 3 with the amount being entered in the box 60 and the price in the box 62. To send the order to the system the voice broker hits the SEND button 64 after which the panel is automatically dimissed. To dismiss the quote panel without SEND, the broker hits QUIT button 66.

Figure 8:
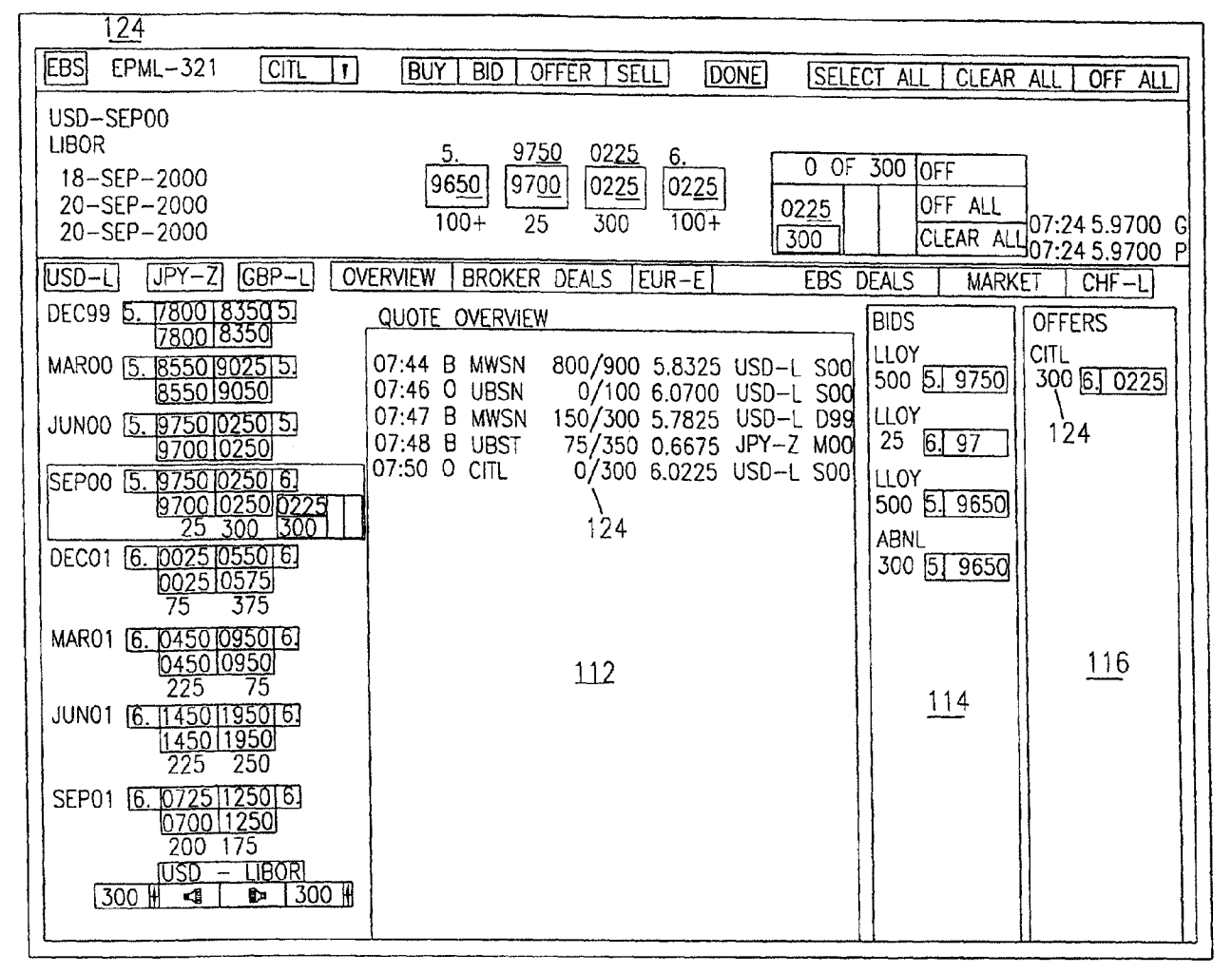

Turning now to FIG. 8, the quote received from the voice broker is included in dealable, that is credit screened, prices distribution to floors who may be able to trade with that counterparty. However, unlike credit information entered by trading floors, the credit information entered by the voice broker only indicates that an institution may wish to trade. Therefore, a trader hitting the quote cannot be certain that the price is dealable or that his hit will be accepted. The screen shown in FIG. 8 is the broker's workstation showing the market from the CITL trader's point of view after the offer has been submitted from him. The order can be seen at 124 as the latest quote in the quote overview window and as the only offer in the traders market panel 114/116. The market panel shows quotes supporting tenor prices in price/time order and are shown highlighted or in a different colour if there is no credit.

In the tenor detail panel the quote is shown as entered against the selected tenor and is also displayed against that tenor in the tenor line. It will be seen that up to three quotes can be entered against any given tenor.

At this stage, the voice broker announces the ATS (Anonymous Trading System) best price to all his traders some of which may also be electronic traders.

Figure 9:
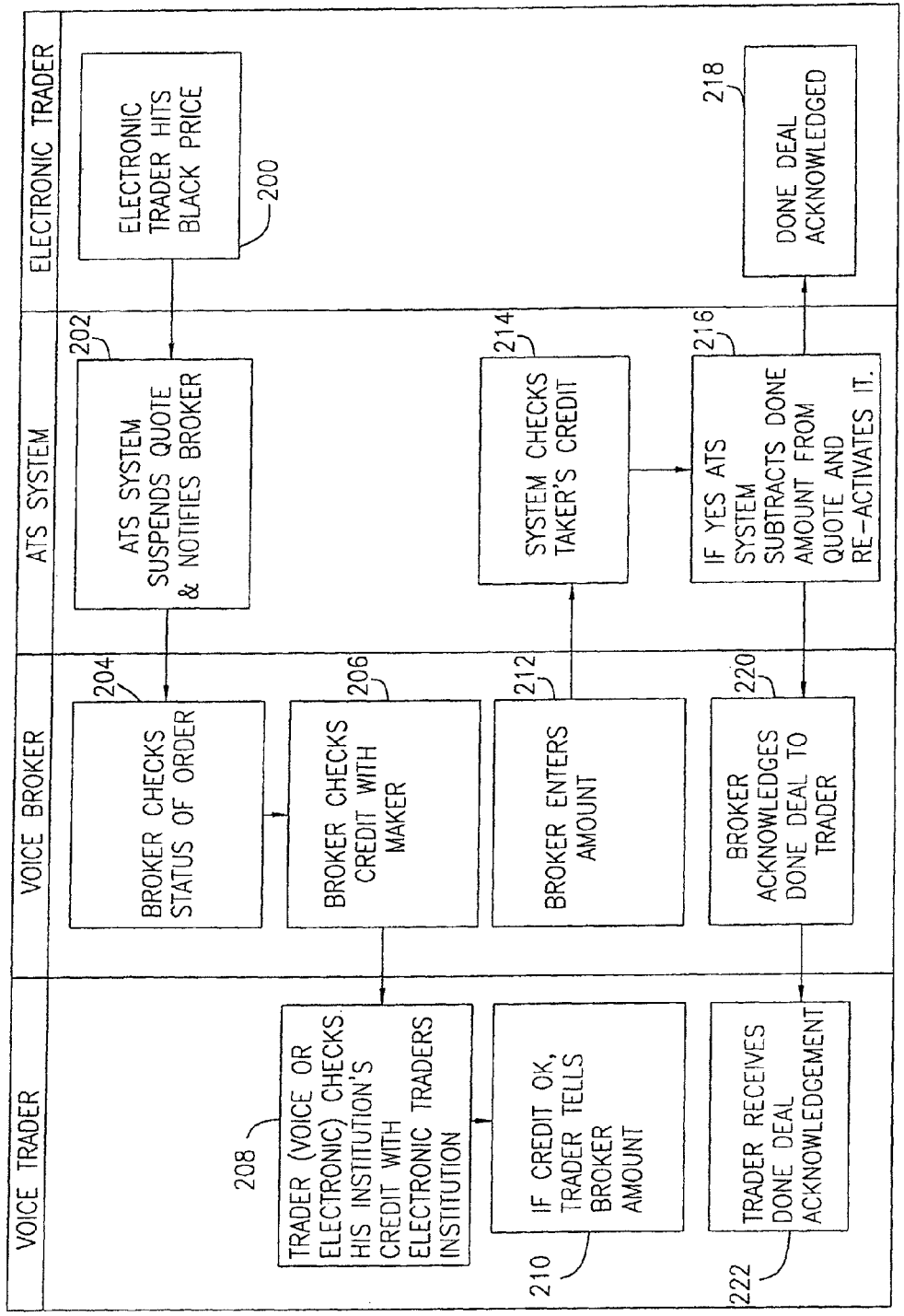
FIG. 9 is a flow chart showing the process when an electronic trader hits the offer submitted by the voice trader.

FIG. 9 illustrates the process which occurs when an electronic trade hits a broker assisted offer which has been submitted as described with reference to FIGS. 5 to 8.

At step 200, the electronic trader hits a price on his screen. If there is credit, the price will appear black, although this is a perfectly arbitrary choice of colour. At step 202, the anonymous trading system (ATS) suspends the quote that has been hit and notifies the voice broker. At step 204 the voice broker checks the status of the order that has been hit and at step 206 checks credit with the maker. At step 208 the trader, who may be voice or electronic, checks his institution's credit with the electronic trader's institution and, if there is sufficient credit tells the voice broker the amount at 210. At 212 the broker enters the amount of the deal to be done into the ATS system and at 214 the system checks the taker's credit (the taker is the electronic trader who hit the price). If the system finds sufficient credit it subtracts the deal amount from the quote and then reactivates it at step 216 unless the order has been fulfilled. At step 218 a done deal is acknowledged at the electronic trader and at step 220 the broker, a notification from the system notifies the done deal to the voice trader who receives the acknowledgement at 222.

Figure 10:
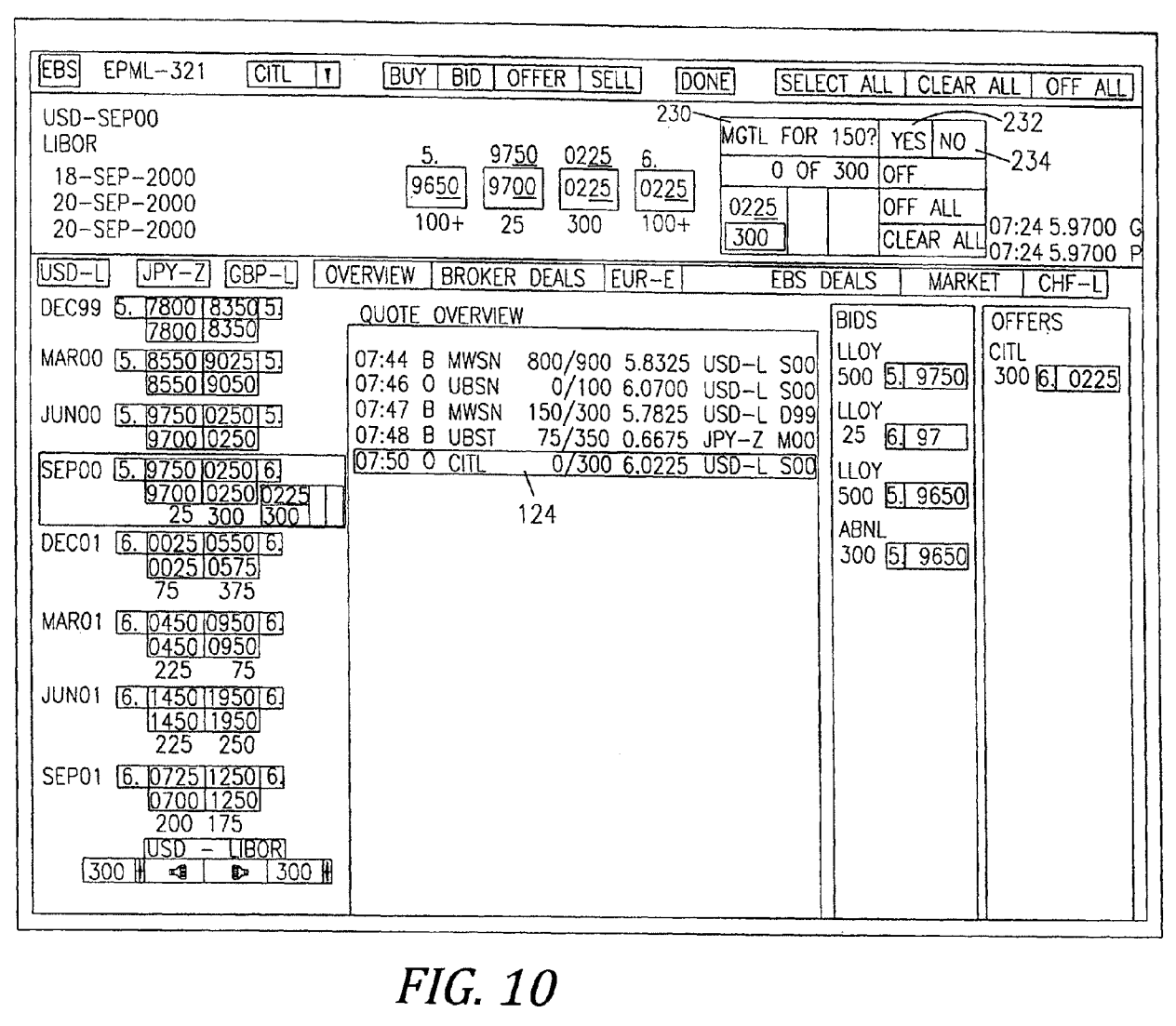
Figure 11:
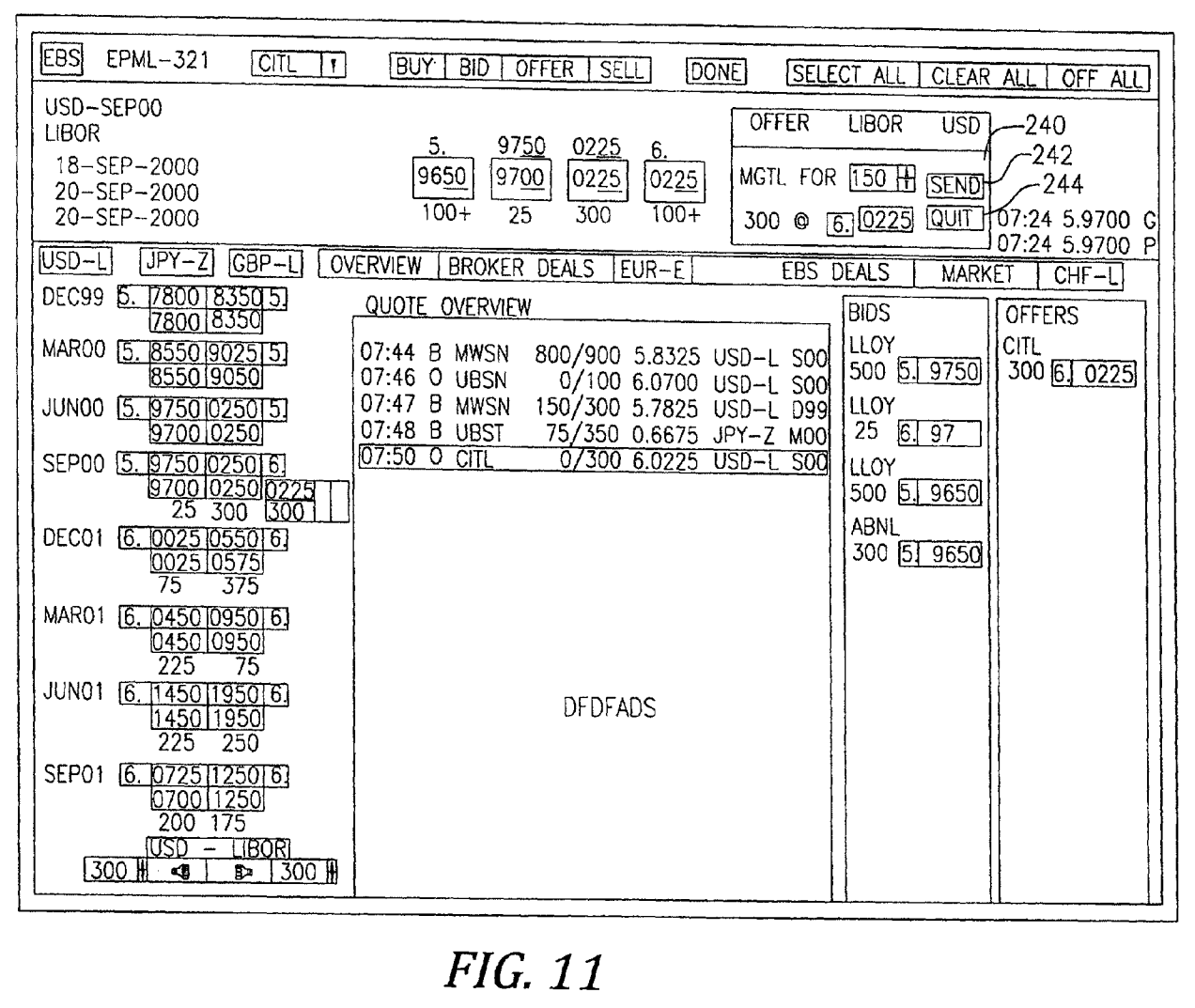
Figure 12:
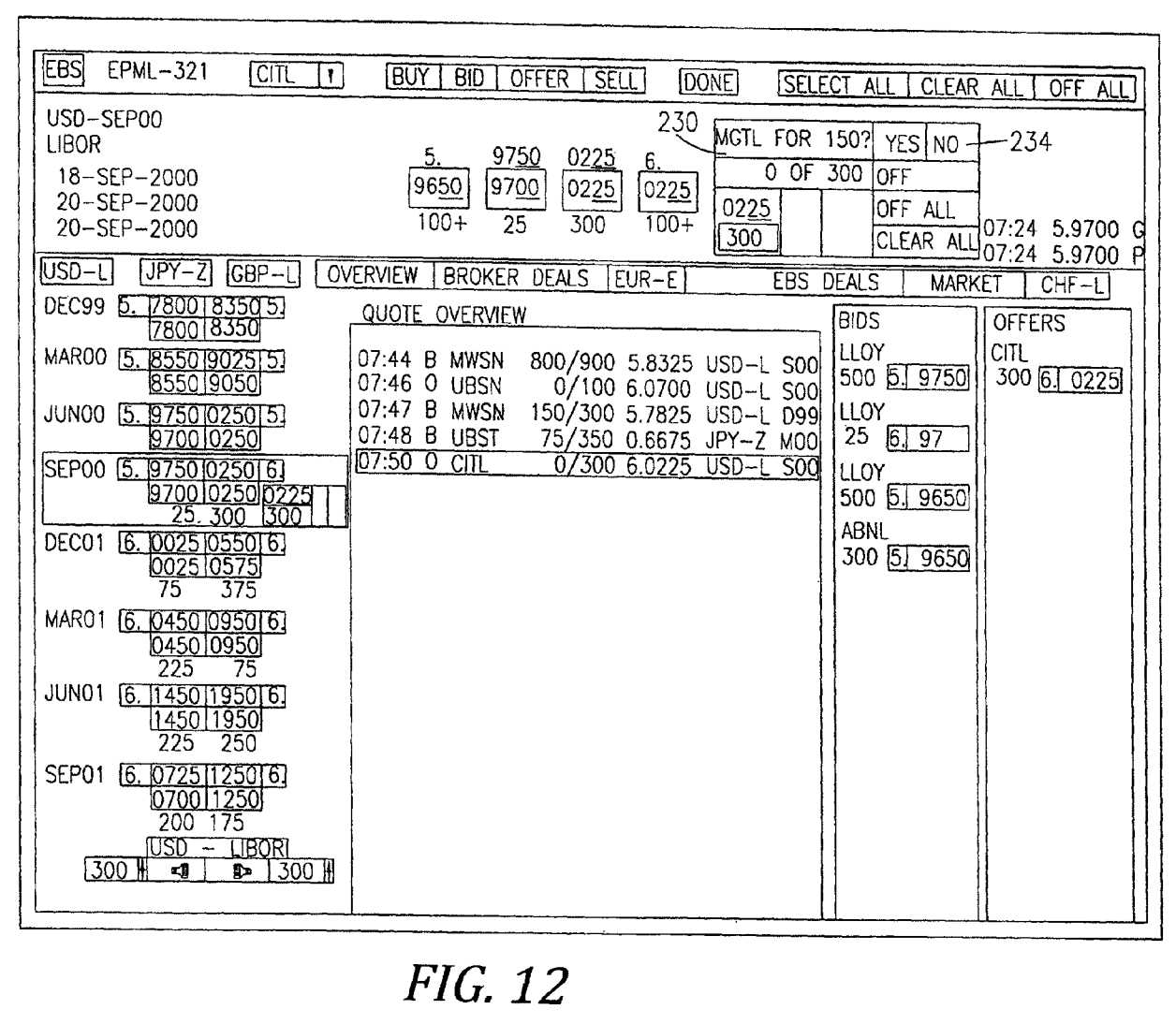

FIGS. 10 to 12 show broker workstation screen shots for the process of FIG. 9.

When the quote is hit, the quote entry in the overview panel 112 will change in appearance, for example it will change to green. In the example the quote that has been hit is the quote 124 input in the previous example. By double clicking the line 124 the broker ensures that CITL is selected in the combo box and that USD-L Sep 00 is the active tenor. In addition the quote overview caption flashes green when there is a hit and the quote status information in the Tenor Line and the Tenor Detail Panel also are displayed in green, or some other colour. The status panel in the Tenor Detail Panel then expands to display at 230 "CPTY for nnn?" where CPTY is the four letter code for the counterparty who has hit the quote and nnn is the amount. "Yes" and "No" response buttons 232, 234 are also displayed to enable the voice broker to respond. The Tenor Sheet Caption also flashes green such that, if it is not the active one in the column, the broker receives an indication that there is a hit at a hidden tenor. The highlighting of the tenor line and tenor detail only occur when the appropriate institution, in this example, CITL, has been selected in the combo box on the tool bar 30 by the voice broker. If a different institution is selected, the overview sheet caption and the quote 124 will still be highlighted to alert the voice broker to the list.

When the hit is received, the broker informs the trader who submitted the quote of the attempted hit. The trader checks that his institution has credit with the electronic trader's institution for all or a portion of the amount and tells the broker the amount. These steps are performed outside the anonymous trading system. If credit is available, the broker clicks the yes button 232.

It will be appreciated that the trade ceases to be anonymous as soon as the taker hits the quote. The taker is necessarily identified to the voice broker as the maker has to perform a credit check which is external to the anonymous trading system.

FIG. 11 shows the broker's workstation after the broker has hit the yes button. A hit confirmation panel 240 appears in the tenor detail panel which identifies the counterparty (MGTL) and the amount. At this stage the amount is displayed in a panel next to a scroll bar enabling the broker to vary the amount. The confirmation panel also shows the price and has send and quit buttons 242, 244. The broker confirms the deal by clicking the send button 242.

If there is an amount of the quote remaining in the system the suspended quote is reactivated. While the quote is suspended it is temporarily withdrawn from the market but retains its position in the queue which is price/time based.

The hit from the electronic trader will time out if not attended to by the broker within a certain time. This is illustrated in FIG. 12 where the quote status panel changes from green to another colour such as grey. The broker can reactivate the hit by clicking the "no" button.

Figure 13:
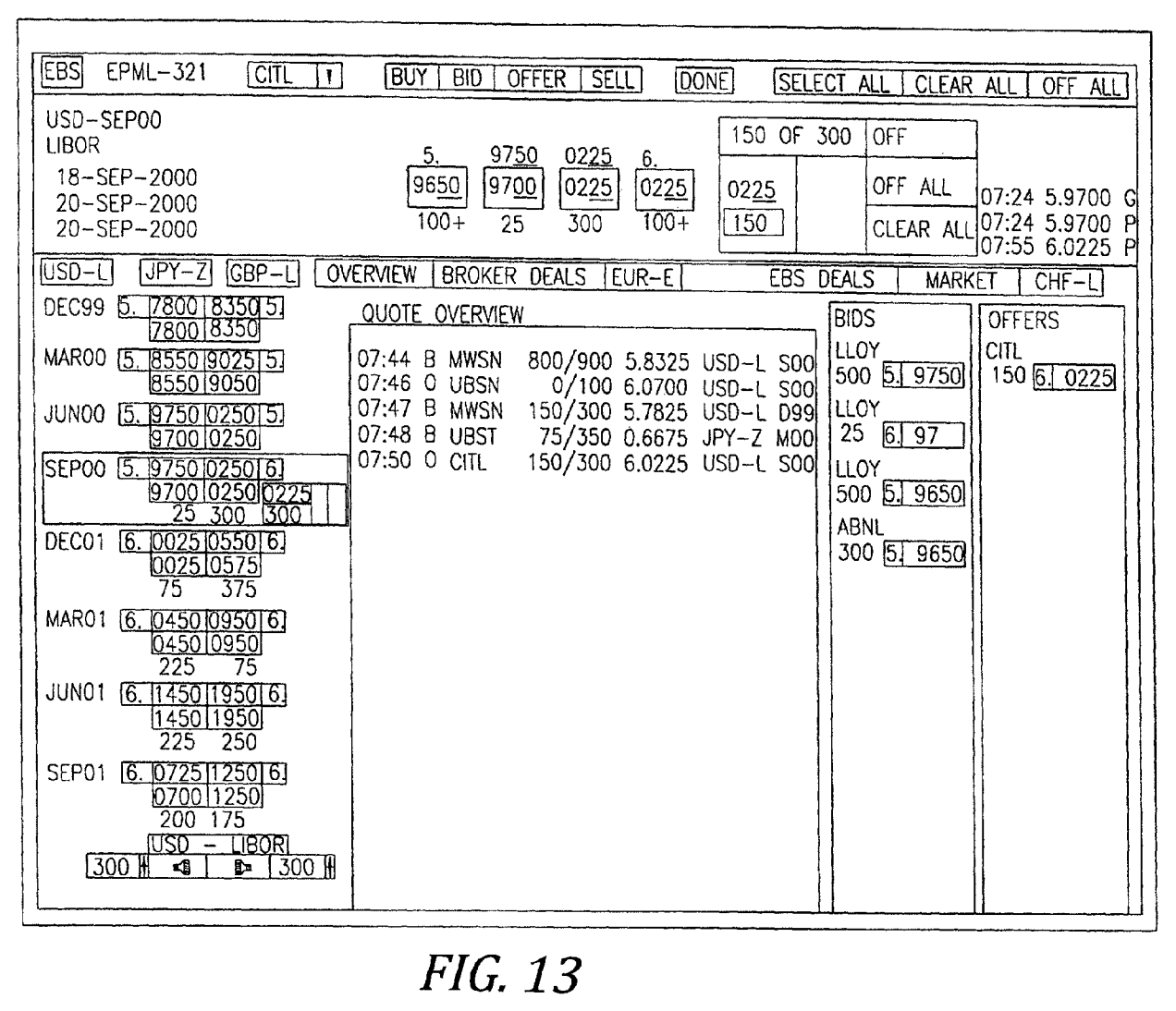

FIG. 13 shows the Broker Workstations Screen showing the market views and book, credit screened for institution CITL once the deal has been completed. The quote 124 which has been traded is shown in the quote overview panel as being of an amount 150/300 indicating that of the 300 original offer amounts, 150 has been fulfilled. The other panel also shows that the amount offered is now 150, reduced from the original 300.

Figure 14:
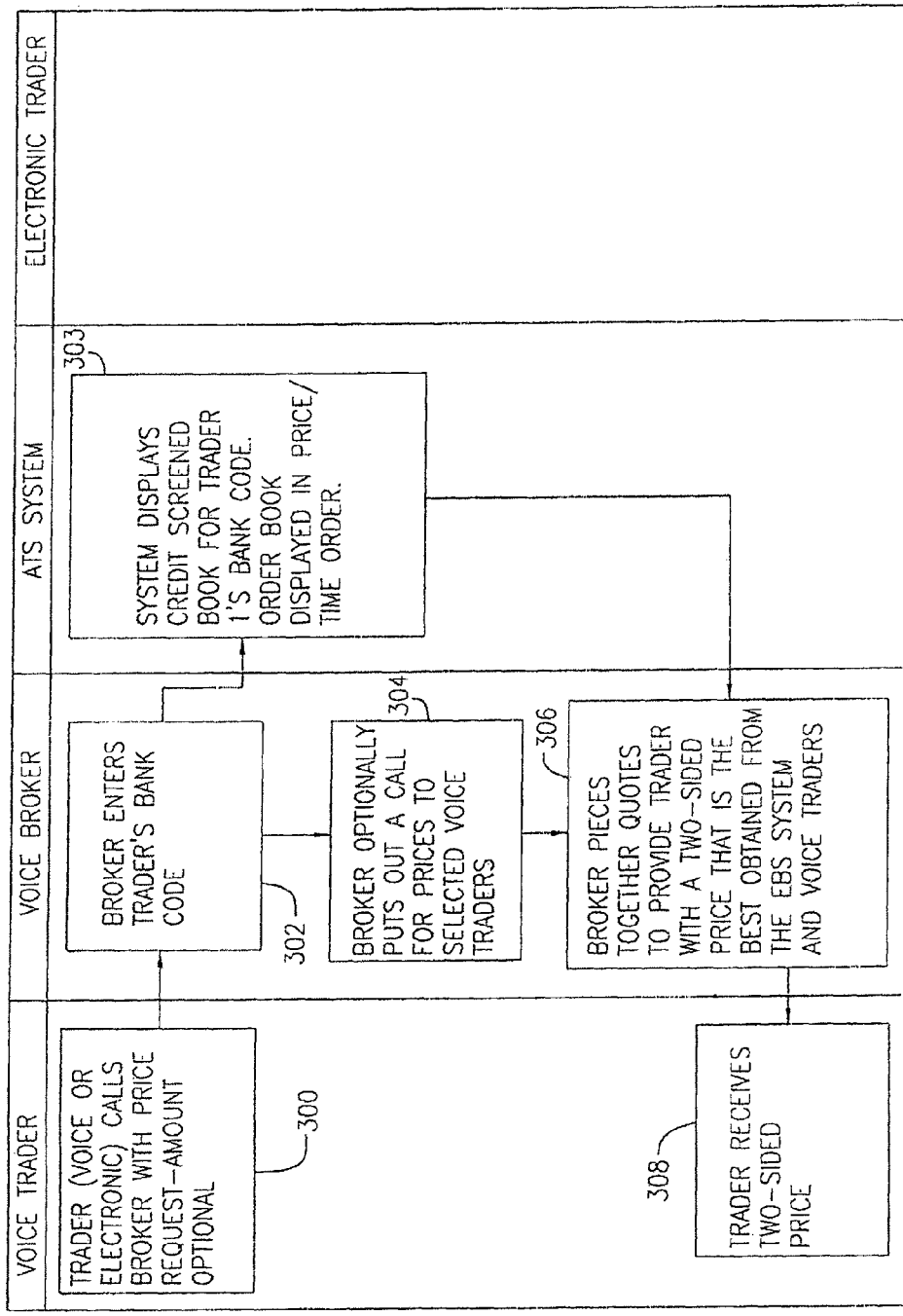
FIG. 14 is a flow chart showing the process when a trader calls the voice broker with a price request.

FIG. 14 shows the process which occurs when a trader calls the voice broker with a price request. The trader may be a voice or an electronic trader. The trader at step 300 calls the broker with a price request. The amount need not be specified. In FIG. 14 the call is shown as made by the voice trader but it could come from an electronic trader. At 302, the broker enters into the ATS the trader's bank code, which is the four digit identifier such as CITL referred to in previous examples. At 303 the anonymous trading system displays the credit screened book for the trade requesting the price with the order book being displayed in price/time order. At step 304 the broker may put out a call for a price to selected voice traders and at step 306 the broker pieces together various information he has gathered to provide the trader with a two sided price. A two sided price is the buy price and the sell price. This price will be deduced from quotes available on the anonymous trading system and prices provided by other traders and will be the best that is available from the two sources. At 308 this best price is received by the trader.

Figure 15:
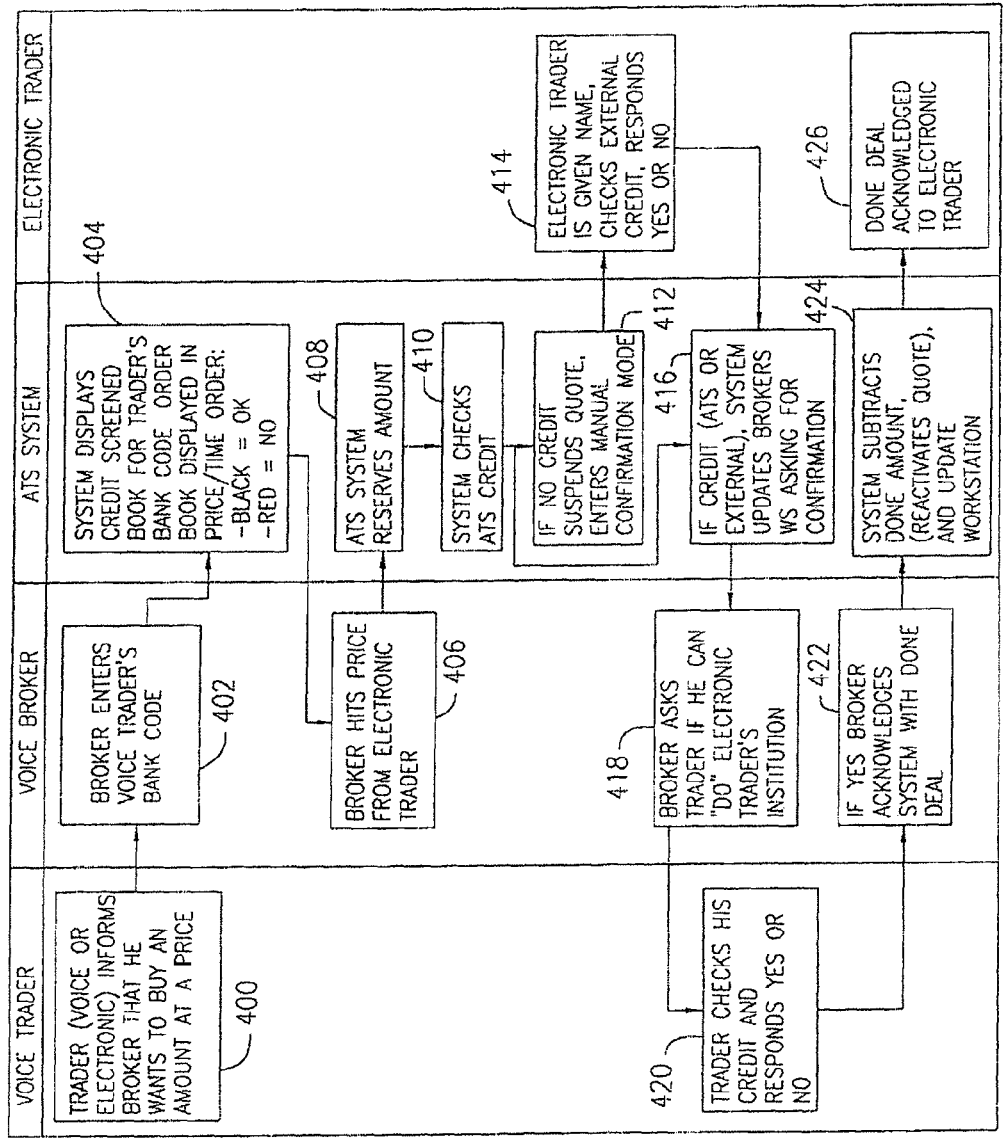
FIG. 15 is a flow chart showing the process when a broker hits a price from an electronic trader.

The following example considers the case where the broker makes a "buy" request on behalf of a trader, who may be voice or electronic. There are three possible scenarios: that the price the broker hits is from an electronic trader; that the price hit is from a voice trader operating on the anonymous trading system through a voice broker; or that the broker hits a price from a call for a price received from outside the anonymous trading system. FIG. 15 shows the process where the price hit is provided by an electronic trader. At 400, the voice trader calls the voice broker and informs the broker that he wants to buy at a certain place. At 402 the broker enters the traders four letter code into the window on his toolbar and at 404 the ATS provides a credit screened book for the traders institution to the voice brokers workstation.

The book is displayed in price/time order with quotes appearing in black being dealable and quotes appearing in red not being dealable.

At 406, the broker hits the price ordered by the trader. In this case the price has been input into the system by an electronic trader. At 408, the ATS reserves the deal amount and at 410 performs a credit check against credit limits stored in the system in the manner described in WO00/16224 and U.S. Pat. No. 5,375,055. If there is not bilateral credit then, at 412, the ATS suspends the quote and enters a manual confirmation mode. At this point, at 414, the electronic trader is provided with the identity of the counterparty on behalf of whom the voice trader is acting and is left to perform their own credit check external to the anonymous trading system. The electronic trader replies "yes" or "no" following the credit check. If the reply is "yes" at step 415 the ATS updates the broker's workstations asking for confirmation. At 418, the broker discloses the identity of the counterparty to the voice trader and asks whether he has credit with that institution. At 420, the trader performs a credit check and provides an answer to the voice broker. If there is credit and the voice trader can do the deal the broker sends, at 422 an acknowledgement to the system with a "done deal" message. At 424, the ATS subtracts the done amount, and if there is any amount left, reactivates the quote. The system then updates all the trader workstations. Finally, at 426, the done deal is acknowledged by the system to the electronic trader.

Figure 16:
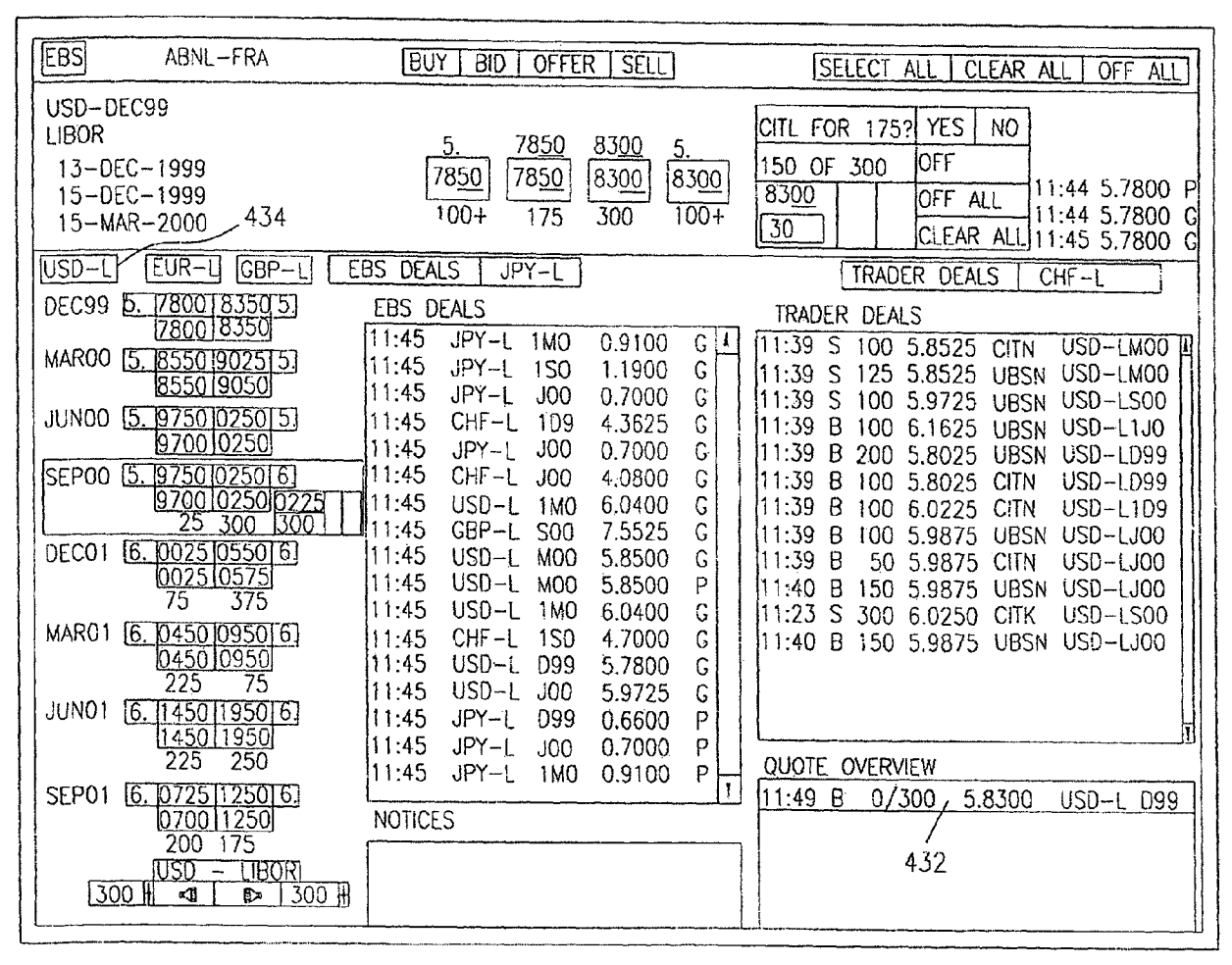

FIG. 16 shows a trader workstation screen shot when there is insufficient credit within the anonymous trading system to complete a hit from a voice broker. It will be noted that this screen is essentially the same as that of FIG. 1. The screen includes, additionally, a quote overview panel 430 arranged below the trader deals panel. When the voice broker hits a price, that price is highlighted on the trader's workstations. In this case the quote 432 is the only quote the trader has in the market and the quote turns green in his quote overview panel. The quote in the tenor line is also highlighted in green as is the sheet 434 in which the tenor is located. For example, if the trader had a GBP-L quote in the market but was displaying the USD-L tenor line, the flashing green GBP-L sheet would show him that there as a hit on a tenor on the GBP-l tenor line. By double clicking the quote in the quote overview, the trader ensures that the quote is the active quote. The status panel in the Tenor Detail Panel is then displayed which identifies the counterparty and the amount and gives the trader the option of accepting or declining or accepting for a reduced amount. It should be understood that if that this status panel only appears if there is insufficient credit within the system for the proposed trade; the trader is being asked for to rectify that there is sufficient additional credit external to the system.

Multiple quotes are ordered in Price/Time order from the middle of the panel outwards and change colour depending on their status. A Blue quote is a quote that is in the market; a Red quote is the best in the market, a Grey quote is a done quote and a Green quote is a hit quote. The status of the quote is displayed in the expanded version of this in the Tenor detail panel. The status information reflects the quote currently selected. This quote has a depressed border around the sub-filed at the bottom of each quote. These amount sub-fields act like radio buttons.

To accept the hit, the trader clicks on the yes button and then enters the amount. If there is insufficient credit for the full amount, the trader may enter a lesser amount.

Figure 17:
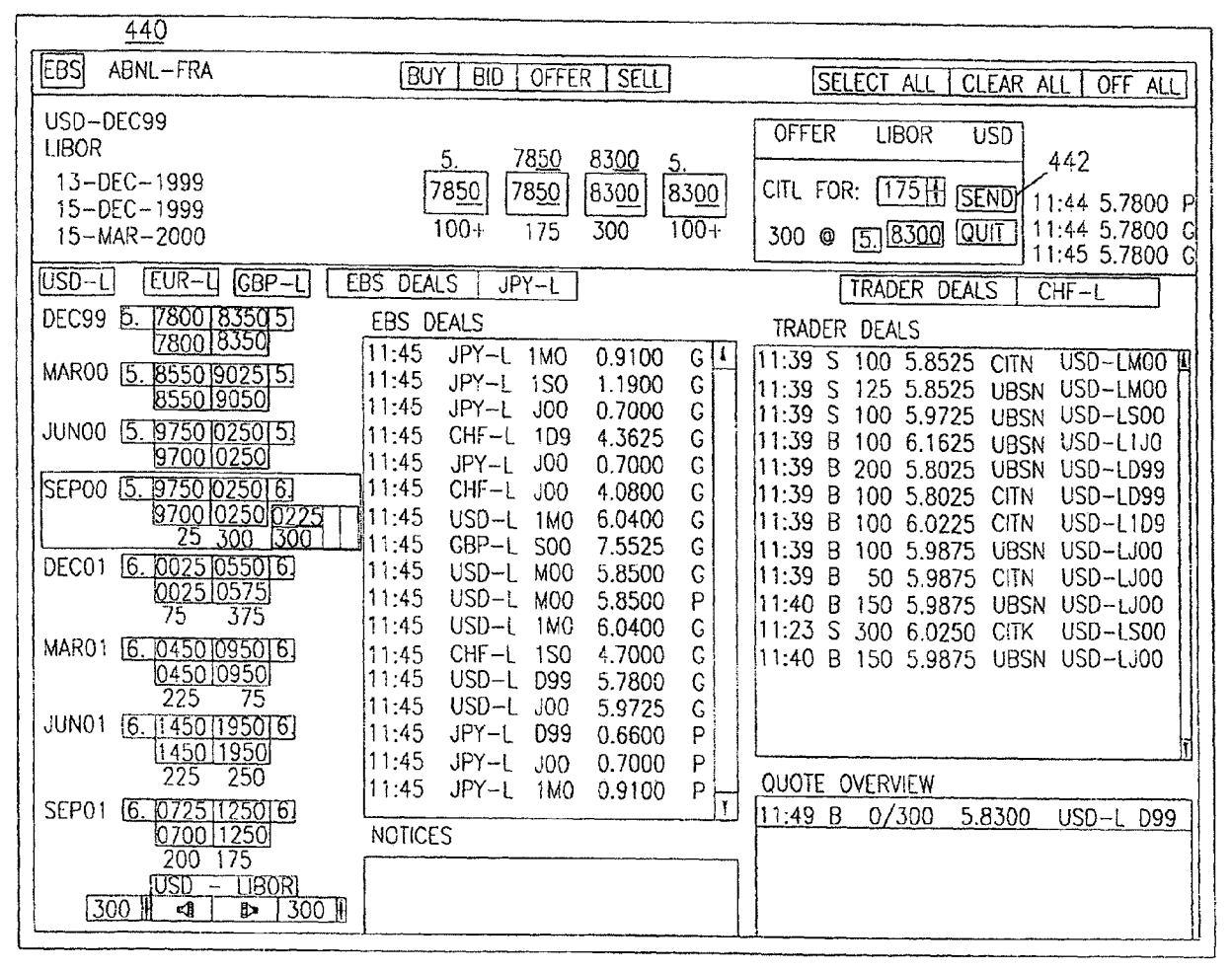

FIG. 17 shows the trader workstations after the trader has accepted the hit from the broker acting on behalf of CITL and showing how the amount accepted can be adjusted.

This is within the list continuation panel 440. When the amount is decided the trader then hits the send button 442. The system will then update the voice brokers workstation with a request for acknowledgement that a deal can be done. The broker asks the voice trader whether he can deal with that counterparty and, if he can, the broker acknowledges the deal to the system which then performs steps 424 and 426 of FIG. 15.

Figure 18:
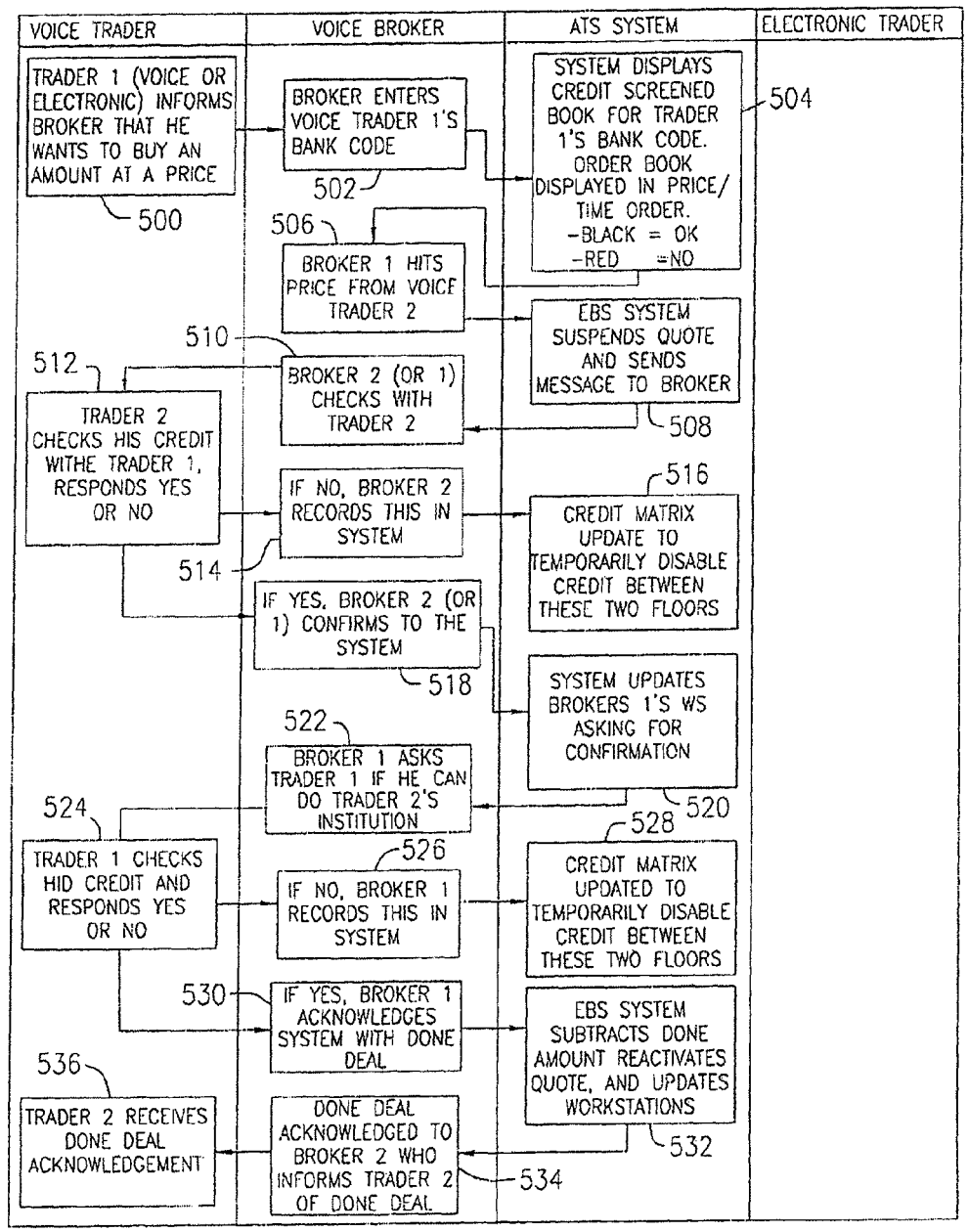
FIG. 18 is a flow chart showing the process when the broker hits a price from another voice trader operating on the anonymous trading system.

FIG. 18 shows the process where the price hit has been submitted by a voice broker trading as the anonymous trading system. Steps 500, 502 and 504 are the same as steps 400-404 in FIG. 15. At step 506, the price that voice trader 1 has asked the broker to hit has been submitted by another voice trader, voice trader 2. In the following discussion it will be assumed that voice trader 2 is acting through a separate voice broker, voice broker 2 although he could be acting through the same voice broker as voice trader 1.

At 508, the ATS suspends the quote that has been hit and sends a message to the voice broker 2 that there has been a hit, identifying the counterparty and the amount. At 510 the second voice broker identifies the hit to voice trader 2 and enquires whether he wishes to do the deal. At 512 trader 2 checks his credit with trader 1's institution and responds to the voice broker. If there is no credit, the second voice broker records a "deal refused" message in the system at 514. The credit matrix is then updated at 514 to disable temporarily credit between these two traders or trading floors. If trader 2 accepts the deal, voice broker 2 confirms the deal to the system at 518 and, at 520 the system updates the first brokers workstation and asks for confirmation. At 522 the first broker then asks his trader if he has credit, which involves disclosing the identity of the counterparty and the amount. At 524 the first trader performs his own external credit check and responds yes or no to his voice broker. If the response is no, the broker enters this into the trading system at 526 and at 528 the credit matrix is disable temporarily between the two trading floors party to the deal. The there is credit, the voice broker at 530 sends an acknowledgement message to the system that the deal is done and at 532 the system subtracts the done amount, reactivates the quote if it is not completely filled and updates all the trader workstations. At 534 the done deal is acknowledged by the first voice broker to the second voice broker who informs the second voice trader who in turn receives the done deal acknowledgement at 536.

Figure 19:
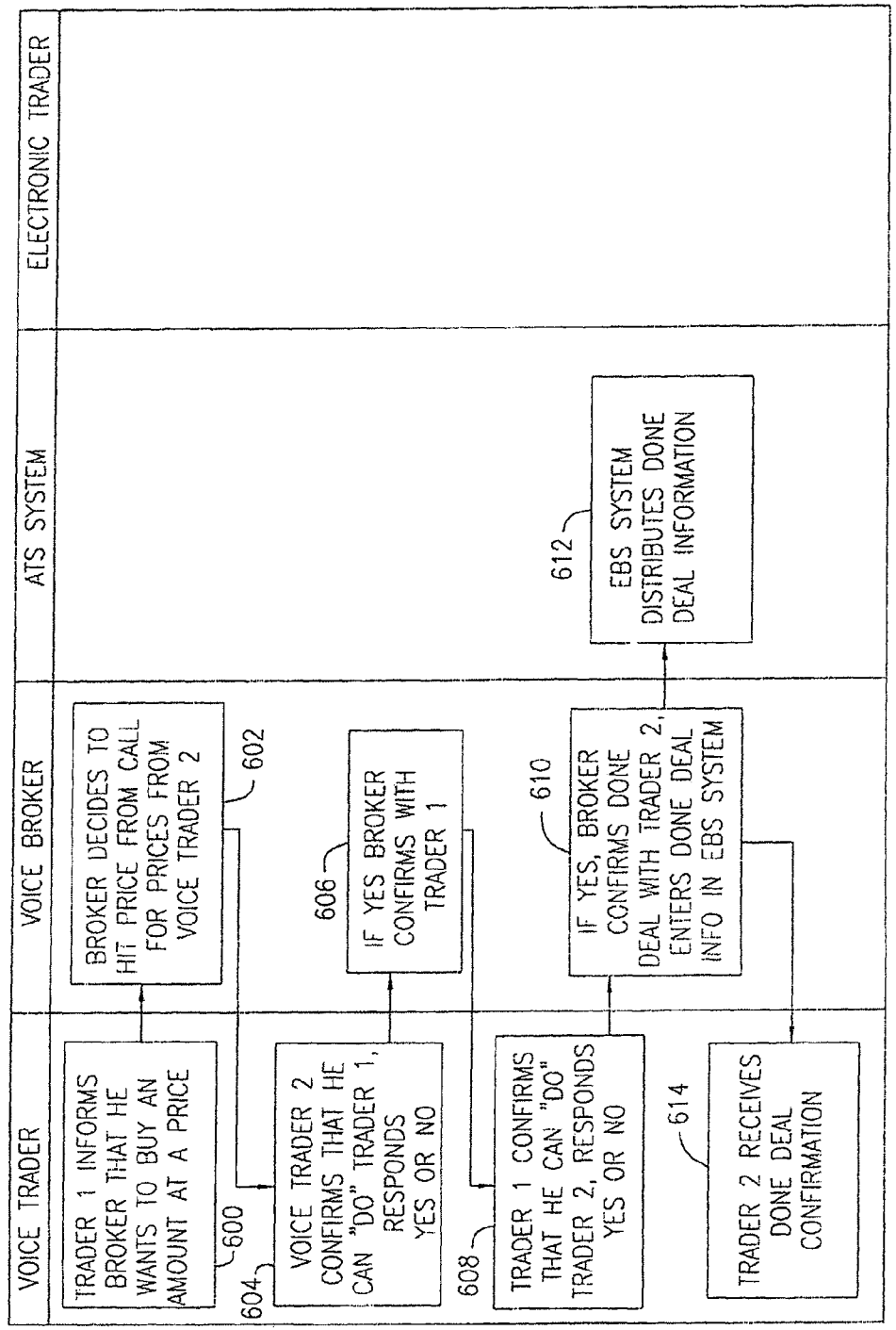
FIG. 19 is a flow chart showing the process where a broker hits a price from a call for a price from outside the trading system.

The final case is where a trader calls the voice broker for a price and the broker hits a price on the trading system. The mechanism for this was described with respect to FIG. 14. Referring to FIG. 19, at 600 a trader informs the voice broker that he wants to buy an amount at a price after the broker has given him the best two-way price.

That price has been offered by another voice broker in this example and the process followed is the regular deal making process between two voice brokers. At 602, the second trader decides to hit the call for a price. At 604 the second trader confirms that he can do the deal and the first either accepts or refuses. If he refuses the process stops. If he accepts, the broker confirming with the first trader at 606. At 608 the first trader confirms that he can do the deal having made the necessary credit checks and the second trader responds with a yes or no. If the answer is a yes, the broker at 610 confirms the deal as done with trader 2 and enters the deal into the anonymous trading system. At 612 the system distributes the deal information to other traders where it will appear in their deals panel. The second trader then receives the deal confirmation at 614.

The broker workstation has a done deal button on the Tenor Detail Panel. Clicking the done deal button displays a deal entry panel which collects information from the broker as to whether the deal is paid or given, the identity of the counterparty, the amount and the price.

Figure 20:
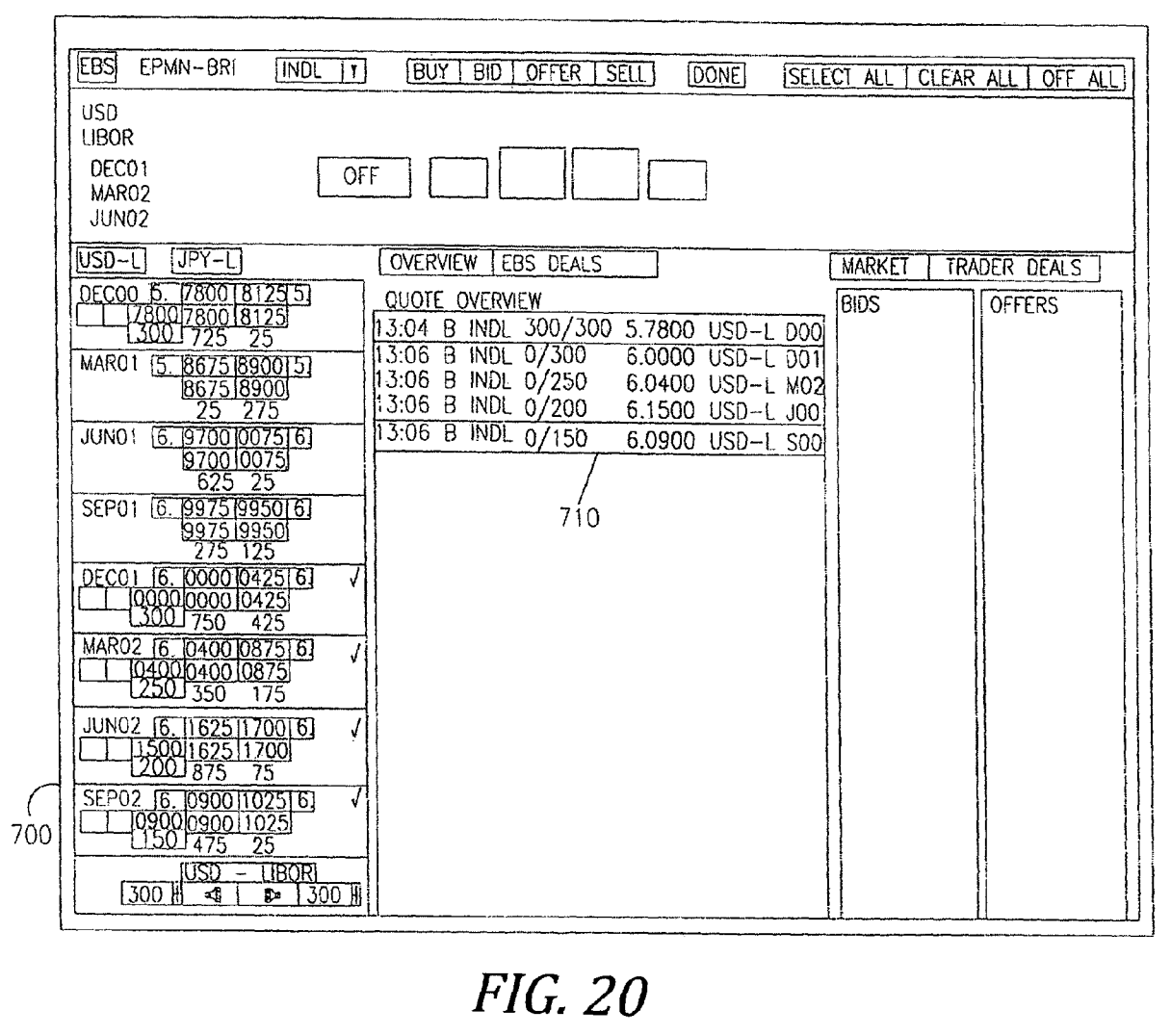

FIG. 20 shows how the display may highlight prices made by voice brokers as opposed to electronic traders by showing these prices in a different colour, for example in pink on the screen. Although hard to discern from FIG. 21, the final quote 710 in the quote overview column has been submitted by a voice broker and is shown in a different colour. This quote is shown in the final tenor at 700 again in a different colour. Also shown in the list of tenors are best prices which are from voice brokers, again in a different colour. It will be appreciated that both sides of the penultimate tenor and the left side of the fourth tenor are from voice brokers.

As can be seen from the tenors for December 1, March 2 and September 2, the Best Dealable price shown is dual colour. The left hand segment, which may be coloured pink, for example, indicates the proportion of the prices in the market that have been entered by voice brokers. Thus, for example, the pink (left hand) portion of the March 2 Tenor Panel shows a greater proportion of dealable prices provided through voice brokers. It follows therefore that the remainder of the market has been provided by electronic trades. This may conveniently be shown in cyan.

The manner in which credit processing is performed within the anonymous trading system will now be described.

The credit processing performed for interest rate futures and other derivatives in general, and FRAs in particular, differs significantly from credit processing for spot FX trading. While spot FX is concerned with settlement risk, for FRAs market risk is the primary concern. For this reason, the technical considerations in implementing the system differ.

For Forward Rate Agreements, three factors are used to calculate credit utilisation;
1. The time between the trade date and the settlement date (start of the contract period), hereinafter called the TTS (Time To Settlement).
2. The volatility of interest rates in the currency of the FRA.
3. The time between the settlement date and the maturity date, ie, the gap of the FRA.

The actual liability for a FRA is not fixed at the time the price is taken because, as can be seen from the formulae above, the actual liability will depend on the difference between the interest rates at the trade and settlement dates. For this reason, a Credit Utilisation formula has been devised and implemented as follows:

Credit utilisation=(Deal size)×(TTS factor)×(# months/3)×(Interest rate volatility factor)×(CCY conversion rate).

The TTS Factor is a Time to Settlement Factor assigned to every month between 0 and 24. When credit is calculated, the workstation will use the TTS Factor assigned to the TTS month. The workstation will calculate the number of months between the Trade Date and Settlement Date to find the TTS Month. The Credit Utilisation calculation will then use the TTS Factor assigned to that month. This allows the TFA to factor into the Credit Utilisation calculation the time between the Trade and Settlement Dates.

The TTS factor is used in the credit calculation. This is a non linear calculation method for the time between trade date and settlement date. A table is produced, initially ranging from 0-36 months, of TTS values to be used in the credit utilisation formula. The factors in the table must be able to be set by the TFA. The table is to be pre-populated with factors calculated by taking the square root of the TTS. The initial values of the table for the 0 and 1 month TTS are to be 1.

Example of pre-populated TTS table:

| | TTS | | | | | | | | |
|---|---|---|---|---|---|---|---|---|---|
| | 0 | 1 | 2 | 3 | 6 | 9 | 12 | 15 | 18 | 36 |
| factor | 1 | 1 | 1.414 | 1.732 | 2.449 | 3 | 3.464 | 3.872 | 4.242 | 6 |

The currency volatility parameter must be able to be entered and modified online via the TFA for each FRA currency traded on the local floor. And as previously explained, the linear calculation method for the contract period or "gap" (the "three month equivalent") is a fixed formula that can't be modified online:

3 mo. Equivalent factor=(# of mos in gap)/3 # of Months in Gap/3—All IMM tenors have a 3 month gap between the Settlement and Maturity Dates. So this value is calculated as 3/3 or 1.

Interest Rate Volatility Factor—The IR Volatility Factor is a percent value assigned to each currency. The system will store the value as a percentage number.

CCY Conversion Rate—The currency conversion rate between the Credit Limit Currency and the currency for which the deal is done.

As an example, a USD June 00 FRA traded Jun. 16, 1998 for 100 million has the following characteristics:
Trade Date: Jun. 16, 1998
Fixing Date: Jun. 19, 1998
Settlement Date: Jun. 21, 2000
Maturity Date: Sep. 20, 2000
Tenor Cap: Jun. 21, 2000 to Sep. 20, 2000 (91 days or 3 Month Gap)
Deal Size: $100,000,000

Factors are assigned by the TFA along with the Credit Limit Currency which is assigned on the Market Access Node. In this example, the Credit Limit Currency is USA. The factors that would be used for the above example are derived using the above table.

Using the above formulae, the credit utilisation is:

(Deal Size)×(TTS Factor)×(# of Months in Gap/3)× (Interest Rate Volatility Factor)×(CCY Conversion Rate)=Credit Utilisation.

(100,000,000)×(4.89898)×(3/3)×0.0014×(1.000)=$68,586=Credit Utilisation.

In implementing credit limits on the FRA system, the Trading Floor Administrator (TFA) has the ability to set and adjust the various parameters from which matching criteria are derived.

A credit utilisation notification is included which issues low credit warning at the trader's WS when the available credit for a counterparty falls below a percentage that is defined via the TFA. An out of credit message is also displayed at the trader's WS when credit is exhausted for a particular counterparty. Prices from that counterparty, for all tenors, will no longer be displayed. A credit utilisation report may be initiated, on demand, via the TFA for both screen and hard copy output.

Parameters Used in the System

Banks initially define, and modify online, the following parameters which are stored at the local MAN for their local trading floor via the TFA facility;
a) credit limit currency—Market Access Node
b) a separate credit limit currency conversions rate parameter for each currency traded on the system.
c) a parameter related to the nature of at least one financial instrument in the form of a currency volatility credit utilisation factor for each currency traded on the system. The currency volatility factor is indicative of the risk associated with each financial instrument assessed by the TFA.
d) Time to Settlement credit utilisation factors for the currencies traded on the local floor. The TTS factor is preferably non-linear and also not specific to any financial instrument traded.

Each credit group preferably comprises a plurality of trading floors. Anyone credit granting entity (which itself could be a trading floor) may trade with a trading floor of a group defined by the TFA if sufficient credit is available.

Banks also define the following for each counterparty (credit group) that they trade which are also stored at the local MAN:
a) available credit
b) low credit warning percentage.

Banks also have the following options for resetting credit utilisation to zero:
a) Automatically at the end of the trading day, as is currently done for spot. The time of the end of the trading day from FRAs is preferably definable separately from that for FX spot.
b) On demand via the TFA
1) for an individual credit group
2) for all credit groups.

The TFA also has the ability to disallow particular floors within a credit group. If a floor is disallowed, it does not take part in the credit of that group.

To be compatible, each of the two parties must make sufficient credit available to the other party to complete a trade for a least the predetermined minimum size deal in any available currency (ie, available credit at least equal to the minimum credit threshold established by the respective credit granting entity).

The calculation is thus:

Minimum credit threshold=Maximum of {(minimum 3 month equivalent amount)×(credit TTS utilisation factor)×(# of months in gap)×(Interest rate volatility factor) (conversion rate)} for each currency.

Derivation of the Pre-Authorisation Matrix

The exemplary Pre-Authorisation Matrix shown in FIG. 20 is derived from the various parameters defined by the Trading Floor Administrator (TFA). In the example shown, each group comprises one trading floor.

Certain prices are said to be dealable, which means that they are pre-screened for credit. A dealable process means that sufficient bilateral credit is available with the counterparty making the price to execute at least one minimum size trade in the tenor that utilises the most credit.

The concept of dealable prices for FRAs is based on credit compatibility for all tenors. Therefore two trading floors are said to be credit compatible if they have bilaterally allocated enough credit to each other to execute one minimum size trade in the tenor that utilises the most credit available on the system.

For each FRA currency a 3 month minimum notional amount is set as a system parameter. The formula to calculate the minimum size for any tenor is;

minimum size=(3 month minimum notional amount)/(# months in gap/3)

Example

EBS has defined the 3 month minimum notional amount=USD 50 mill
The minimum size for a USD June 98=(50 mill)/(3/3)=USD 50 mill. The minimum size for a USD Sept98-6=(50 mill)(6/3)=USD 25 mill Since credit utilisation is a function of;
1. Time between trade date and settlement date (TTS)
2. Time between settlement and maturity (gap)
3. The volatility of interest rates in the currency of the FRA then for two floors to be credit compatible they must have sufficient credit available to execute a trade for a minimum size in the tenor with the highest calculated utilisation. This should mean that, subject to credit changing during deal completion, the two parties will be able to complete a deal in any currency at least of minimum size.

A trading floor can control, to an extent, the minimum credit threshold necessary to display dealable prices by modifying time to settlement factors with times to settlement that utilise the most credit. For example, a floor can specify time to settlement factors which do not increase for those factors beyond where they want to trade. Also, a floor can set the currency conversion to zero for particular currencies thus electing not to trade in volatile currencies offered, thus reducing the credit availability necessary to see prices in less volatile currencies.

Example

The system of the present embodiment allows trading in tenor ranging from 0×1 out to 24×27 in USD, GBP and JPY.

The minimum trade size defined is set as USD 50 million (3 month equivalent notional value).

In the following case, for floor A to see dealable prices from floor B they must allocate sufficient credit to execute one trade in USD for a minimum notional size 50 million.

Trading floor A uses USD as their credit limit currency.

Trading floor A is only trading USD FRAs.

Trading floor A has assigned a currency volatility factor to USD of 0.5%.

For floor A to see prices from floor B, it must allocate sufficient credit to floor B to execute on USD Mar 00 (24 months away) for USD 50 mil.

The minimum credit is calculates as follows (the TTS factor is assumed to be the square root of the TTS): minimum available credit=(4,4889)*(0.005)*(50,000000)=$1,122,225.

Having calculated the minimum credit threshold, the Market Access Node then calculates for each potential counterparty whether at least the minimum order seize could be dealt by checking against the credit limit available for the Credit Group associated with that counterparty, and transmits a CreditUpdate message to the affected Arbitrator(s) and Market Distributor(s) containing a simple binary indication of whether credit is currently available or not available to each designated potential counterparty in an amount at least equal to the calculated minimum credit threshold established by the credit granting entity associated with that Market Access Node. Provided that the relevant threshold has been met, the Arbitrator(s) and Market Distributor(s) receiving the CreditUpdate message place a "1" in the associated cell of their Pre-Authorisation Matrix. Conversely, if the CreditUpdate message indicates that the available credit is below the relevant threshold, the Arbitrator(s) and Market Distributor(s) receiving the CreditUpdate message place a "0" in the associated cell.

The Pre-Authorisation Matrix is then used in known fashion to pre-screen distributed buy/sell orders so that only "dealable" prices are shown to traders.

The foregoing discussion excluded, for simplicity, the handling of credit as between the broker workstation and other institutions.

As will be clear from the previous discussion, the voice broker can submit to the trading system the identity of a client institution. The system then displays at the broker's workstation credit-screened prices and a credit-screened view of the book, based on the credit matrix for the selected counterparty. Thus, the broker workstation provides a plurality of trading parties and the broker can select a market view for a given trading party.

The broker workstation can display dealable prices and the best price on the system (which may be from a counterparty with whom there is no credit) for each instrument traded on the system. These prices are displayed din the same way as the regular trader workstations if the institution ID entered by the broker were on the matrix system. The broker workstation also shows all dealable quotes in the market for each instrument traded on the system. These quotes are sorted in price/time order and indicate the originating bank ID. These quotes are colour coded according to the credit matrix with black indicating that credit is available and red that no credit is available.

The broker workstation can also display a complete view of the book with no credit screening. This enables the broker to see a complete view of the market across its depth when he is not acting on behalf of a particular trader.

The broker workstation shows all deals in which the broker has been involved, but unlike trader workstations both parties are disclosed and the deals information can be filtered by voice trader or institution.

As shown in FIG. 4, the broker workstations are connected to a market access node, these may be a number of market access nodes each with one or more broker workstations attached. The market access node for the broker workstations performs a number of functions as follows:

1. Submission of broker quotes to the arbitrator.
2. Cancellation of broker quotes.
3. Reception of whole book for a specific tenor and transmission to a broker workstation.
4. Reception of the credit matrix and update for a specific floor from the market distributor.
5. Reception of the system market view for each trader on whose behalf the voice broker can act.
6. Submission of hits from the voice broker to the arbitrator against a specific quote.
7. Rejection or confirmation of deals.
8. Logging of deals in a trade database.
9. Printing and reprinting of deal tickets.
10. Hand off to the voice broker and customer's back office systems.

Our earlier application WO00/16224 describes the message flow around the network of the type described in FIG. 4. For reasons of brevity, that will not be repeated reference is directed to that publication. The inclusion of the broker workstation(s) and associated one or more market access nodes gives rise to a number of additional broker related messages as follows.

A Broker Quote message is used to submit a hit entered by the broker. The message also contains the quote targeted by the hit and is sent by the broker's market access node to the arbitrator.

A Broker Hit Notify message is sent by the arbitrator to the maker market access node (that is the node from which the quote that been hit originated) to notify that node about the broker deal. It also causes the market access note to display a message of the maker trader workstations that a manual credit check is required.

Broker deal status (Maker/Taker) is a pair of messages which informs the components involved in a deal (maker and taker) about the broker deal.

A Broker Hit Processed message informs various components about the deals done by the voice broker manually. It is by means of this message that deals conducted outside the system are entered into the system. This is an important aspect of the embodiment described as it enables the electronic trading system to have a more complete view of the market and so offer traders a more transparent environment within which to operate.

It will be appreciated that the embodiment of the invention described is only one of many embodiments of the invention. The description has been given with specific reference to FRAs but it will be appreciated that the invention is applicable not only to other financial instruments such as F/X spot etc. but also to other fungible products such as metals, pork bellies and other commodities. The manner in which credit limits are determined will vary depending on the nature of the instrument or commodity being traded but the principle of automated credit checking for wholly anonymous deals with manual checking for voice broker assisted deals remains unchanged.

The network described has a lot of distributed functionality. Other network configurations are possible. For example, a centralised network with a trader and broker terminals connected to a host completer would be possible. In such an arrangement, matching, credit checking and the assembling of market views would all take place at the host.

What is claimed is:

1. A computerised trading system for trading instruments between parties including a plurality of order input terminals for inputting bid and offer orders on behalf of traders, a matching engine computer for matching bids and offers input by traders and, where matches are made, for executing deals, and one or more market distributor computers for distributing details of at least a portion of the bids and offers in the market to traders, wherein the order input terminals comprise trader order input terminals and at least one broker order input terminal for entering bids and offers into the system on behalf of traders operating outside the system and wherein the full trading book is distributed to the at least one broker order input terminal.

* * * * *